(12) United States Patent
Oshins et al.

(10) Patent No.: US 12,542,828 B2
(45) Date of Patent: Feb. 3, 2026

(54) NETWORK STORAGE ACCELERATION

(71) Applicant: Microsoft Technology Licensing, LLC, Redmond, WA (US)

(72) Inventors: Jacob Kappeler Oshins, Seattle, WA (US); Justin Thomas Neddo, Kenmore, WA (US); Yi Yuan, Redmond, WA (US); Lukasz Cezary Tomczyk, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/361,740

(22) Filed: Jul. 28, 2023

(65) Prior Publication Data
US 2025/0039261 A1 Jan. 30, 2025

(51) Int. Cl.
*H04L 67/1097* (2022.01)
*H04L 67/141* (2022.01)
*H04L 67/146* (2022.01)

(52) U.S. Cl.
CPC ........ *H04L 67/1097* (2013.01); *H04L 67/141* (2013.01); *H04L 67/146* (2013.01)

(58) Field of Classification Search
CPC .. H04L 67/1097; H04L 67/141; H04L 67/146
See application file for complete search history.

(56) References Cited

U.S. PATENT DOCUMENTS 11,226,773 B1* 1/2022 Patel ............... G06F 3/0664
11,520,527 B1* 12/2022 Alkalay ........... G06F 3/0631
11,861,221 B1* 1/2024 Richardson ...... G06F 3/0604
11,954,238 B1* 4/2024 Tan ................ H04L 9/0891
12,184,722 B2* 12/2024 Rao Krishnagi ..... H04L 67/146
2004/0054866 A1 3/2004 Blumenau et al.
2020/0007530 A1* 1/2020 Mohamad Abdul ........ H04W 12/084
2020/0136996 A1 4/2020 Li (Continued)

OTHER PUBLICATIONS

"NVMe Specifications Overview", Retrieved from: https://nvmexpress.org/specifications/, Retrieved Date: May 10, 2023, 4 Pages.

(Continued)

*Primary Examiner* — Blake J Rubin
(74) *Attorney, Agent, or Firm* — Weaver IP L.L.C.

(57) ABSTRACT

Systems, methods, devices, and computer readable storage media described herein provide network storage acceleration techniques. In an aspect, a command is received from an application by a storage interface controller. The command is configured to establish a connection with a storage node of a storage service of a storage system. The command comprises a session token corresponding to a session between the application and the storage service. The session token is provided to a broker at a first endpoint. The broker is configured to manage a cluster of storage nodes. The cluster of storage nodes comprises the storage node. A response is received from the broker. The response comprises a second endpoint associated with the storage node. A connection with the second endpoint is established. The second endpoint is mapped to a storage object. In a further aspect, the storage interface controller is a non-volatile memory express (NVMe) controller.

20 Claims, 9 Drawing Sheets

(56) References Cited

U.S. PATENT DOCUMENTS

| | | | | |
|---|---|---|---|---|
| 2020/0225874 A1* | 7/2020 | Nimmagadda | ....... | G06F 3/0661 |
| 2020/0310661 A1* | 10/2020 | Benisty | ................ | G06F 3/0622 |
| 2021/0133734 A1* | 5/2021 | Jensen | .................... | G06F 9/466 |
| 2021/0326223 A1* | 10/2021 | Grunwald | ............ | G06F 9/44505 |
| 2021/0342298 A1* | 11/2021 | Mathews | .............. | G06F 16/128 |
| 2022/0027059 A1* | 1/2022 | Chen | ..................... | G06F 3/0689 |
| 2022/0171567 A1 | 6/2022 | Matosevich | | |
| 2022/0229569 A1* | 7/2022 | Lee | ....................... | G06F 3/0653 |
| 2022/0300418 A1* | 9/2022 | Baugh | ................ | G06F 12/0284 |
| 2022/0391333 A1 | 12/2022 | Veluswamy | | |
| 2023/0185746 A1* | 6/2023 | Prabhakar | ............. | G06F 3/0659 709/212 |
| 2023/0247087 A1* | 8/2023 | Nagaraja | ............... | H04L 9/3213 709/201 |
| 2023/0333879 A1* | 10/2023 | Goel | .................... | G06F 9/44505 |
| 2023/0342037 A1* | 10/2023 | Sahin | .................... | G06F 3/0659 |
| 2023/0353635 A1* | 11/2023 | Karumbunathan | ......................... | H04L 67/1097 |
| 2024/0031446 A1* | 1/2024 | Rajagopalan | ....... | H04L 12/4679 |
| 2024/0080277 A1* | 3/2024 | Lee | .......................... | H04L 67/60 |
| 2024/0195877 A1* | 6/2024 | Xue | ...................... | H04L 67/142 |
| 2024/0201886 A1* | 6/2024 | Venkatanarayanan | ....................... | G06F 3/0665 |
| 2024/0223566 A1* | 7/2024 | Hu | ..................... | H04L 63/0815 |

OTHER PUBLICATIONS

Calder, et al., "Windows Azure Storage: A Highly Available Cloud Storage Service with Strong Consistency", In Proceedings of 23rd ACM Symposium on Operating Systems Principles, Oct. 23, 2011, pp. 143-157.

Myers, et al., "Azure Blob Storage error codes", Retrieved from: https://learn.microsoft.com/en-us/rest/api/storageservices/blob-service-error-codes, Feb. 1, 2023, 8 Pages.

International Search Report and Written Opinion received for PCT Application No. PCT/US2024/036296, Oct. 7, 2024, 15 pages.

* cited by examiner

NETWORK STORAGE ACCELERATION

BACKGROUND

A cloud computing platform may include a cloud storage service that includes front end services and clusters of storage nodes that store data. The front end services translate between the protocol of a client requesting access to data stored by a storage system and the mechanisms used to store the data (e.g., the storage nodes). These protocols typically utilize compute resources on the client computing device and the storage system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for providing network storage acceleration. In an aspect, a first command is received by a storage interface controller of a computing device from an application. The first command is configured to establish a connection with a storage node of a storage service of a storage system. The first command comprises a session token corresponding to a session between the application and the storage service. The session token is provided to a first broker at a first endpoint. The first broker is configured to manage a cluster of storage nodes. The cluster of storage nodes comprises the storage node. A first response is received from the first broker. The first response comprising a second endpoint associated with the storage node. A connection with the second endpoint is established. The second endpoint is mapped to a storage object.

In a further aspect, prior to receiving the first command, a second command is received from the application. The second command is configured to establish a connection with the storage service. Responsive to receiving the second command, the first endpoint is obtained. The first endpoint is mapped to the session token. The session token is provided to the first broker based on the first endpoint having been mapped to the session token.

In a further aspect, the first endpoint is obtained by providing the session token to a second broker of the storage service. The second broker is configured to manage traffic to and from a set of brokers of the storage service. The set of brokers comprises the first broker. A second response is received from the second broker. The second response comprises the first endpoint.

In another aspect, a command configured to access a storage object is received from an application. The command comprises an identifier of the storage object. The storage interface controller transmits, to the storage service, a request to access the storage object.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
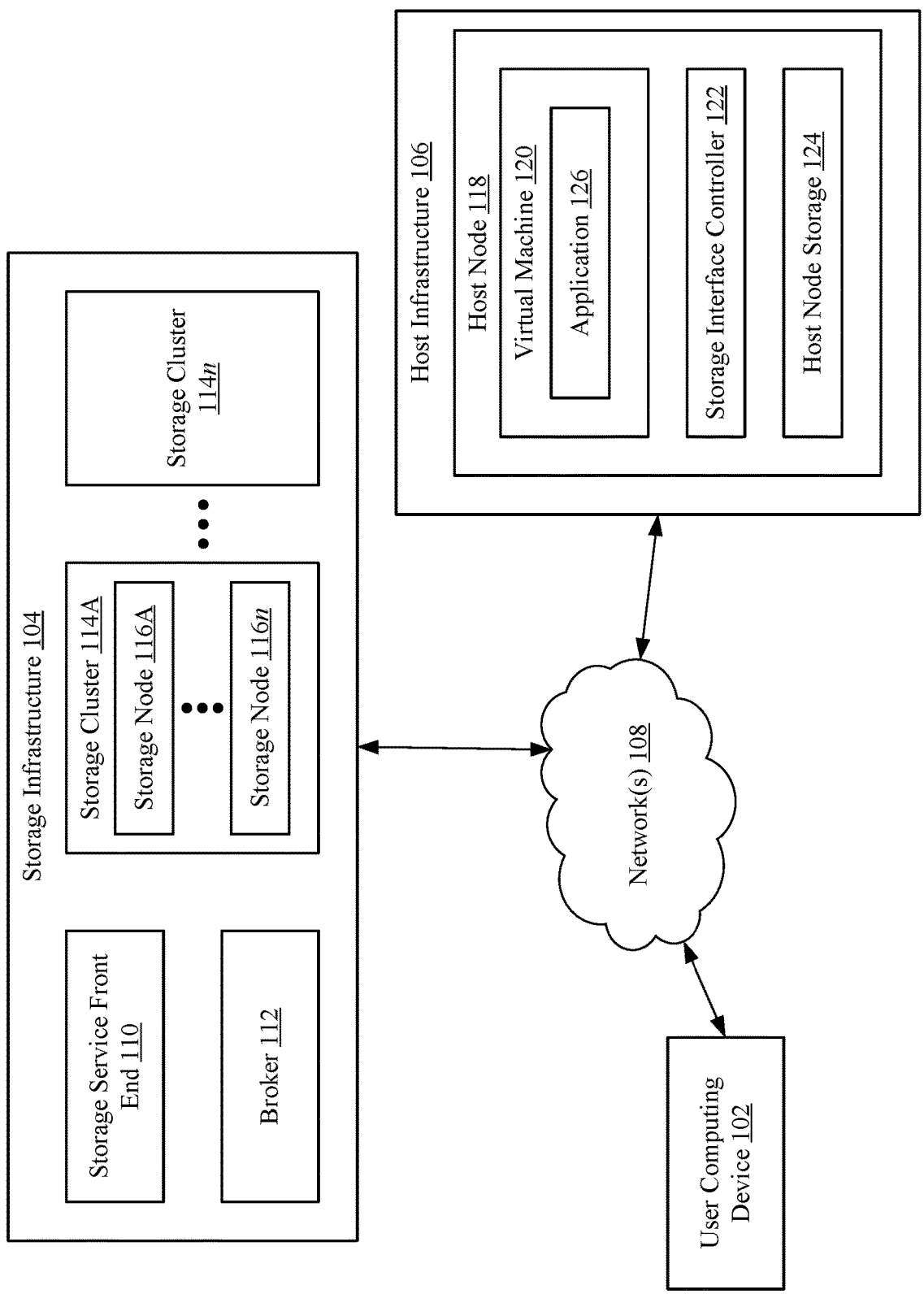
FIG. 1 shows a block diagram of a system for network storage acceleration, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Network Storage Acceleration

Cloud computing environments can include cloud storage systems. A storage service of the storage system may have various "front end" services that translate between the protocol a client requesting access to data stored by the storage system and the mechanisms used to store the data. Examples of such protocols include, but are not limited to, network file system (NFS) protocols, server message block (SMB) protocols, non-volatile memory express (NVMe) over Fabrics (NVMe-oF), and representational state transfer (REST) based protocols (e.g., a REST based protocol using hypertext transfer protocol secure (HTTPS)). These protocols may utilize compute resources on a client computing device and in the storage system, costing time and resource usage in both environments. For instance, in an implementation using Blob storage, HTTP, transport layer security (TLS), and transaction control protocol/internet protocol (TCP/IP) may utilize compute resources in the client computing device and/or the storage system.

The time and/or resources utilized by these protocols may limit throughput of a system. For instance, control processing unit (CPU) time spent on protocols may limit throughput of the system. Storage performance is typically measured in bytes per second (also referred to as "throughput") and input/output (I/O) operations per second (also referred to as "IOPS"). A limit of IOPS may be similar to or the same as the CPU time. In some implementations, throughput is limited by CPU time as well. Furthermore, these protocols can be costly in terms of compute resources required as well as economically (e.g., the economic cost of using the resources, the economic cost of using the application, etc.).

Nodes of a cloud computing environment executing virtual machines may include various interfaces (e.g., network interfaces, storage interfaces, etc.). For instance, a node in accordance with an embodiment comprises an accelerator. For example, an accelerator of a node in accordance with a further embodiment is a smart network interface card (NIC). The smart NIC is used to expose services on the network through interfaces such as a network interface and a storage interface. The storage interface may be used to expose virtual disks (e.g., a NVMe storage interface may expose "namespaces"). The virtual disks are used by virtual machines executed by the node to store and/or access data stored by the node. However, these virtual machines may also use storage provided by a storage service of the cloud computing environment, such as cloud storage objects (e.g., blob storage (e.g., page blobs, block blobs, etc.), cloud-based file storage, cloud-based table storage, queues, etc.).

Embodiments of the present disclosure are directed to network storage acceleration. For instance, a storage interface controller (e.g., an NVMe controller) is configured to provide a hardware-level interface to storage objects stored by a storage service of a storage system. In an aspect, the storage interface controller receives a command from an application. The command is configured to establish a connection with a storage node of the storage service. The command comprises a session token corresponding to a session between the storage service and the application. The storage interface controller provides the session token to a broker at a first endpoint. The broker is configured to manage a cluster of storage nodes of the storage system, the cluster comprising the storage node. The broker verifies the session token is valid and provides a second endpoint associated with the storage node. The storage interface controller receives a response from the broker comprising the second endpoint and establishes a connection with the endpoint. The storage interface controller maps the second endpoint to the storage object. In this manner, the storage interface controller enables applications and/or device to utilize the storage interface controller to access the storage object mapped to the second endpoint. For instance, the storage interface controller may exposes a representation of an index of the storage interface controller (e.g., as a key of a key value namespace of the storage interface controller) that is mapped to the storage object stored by the storage service.

Thus, embodiments enable applications executed by a "host node" (i.e., a node executing a virtual machine (e.g., that executes such applications), an unvirtualized host, and/or another type of host node suitable for executing an application) to access data stored by a cloud storage service via a storage interface controller. In this context, the storage interface controller may implement techniques to improve efficiency in the operation of the application, the host node, and/or communications between the host node, the controller, and the storage service in accessing data stored by the cloud storage service. For instance, a storage interface controller may be enabled to utilize accelerator chips, data processing unit (DPU) acceleration, or other techniques with respect to data stored by a cloud storage service to increase transaction efficiency, reduce data transfer times, and/or reduce computing resource overhead. Moreover, by using a storage interface controller to access data stored by a cloud storage service, embodiments of the present disclosure may reduce economic and/or compute resource costs.

Embodiments of storage interface controllers described herein may also be used to implement policy enforcement techniques with respect to data stored by a cloud storage service and accessed by a connection established between a storage interface controller and the storage service. For instance, a storage interface controller may be configured to implement a particular encryption policy.

Embodiments of the present disclosure also enable offloading operations from a processor of a host node. For instance, techniques of network storage acceleration described herein may map cloud storage objects to an index of a storage interface controller. This enables a host node, or a smart NIC of a host node, to offload conversion of storage commands into network-layer transactions, targeted at storage clusters. Furthermore, by mapping cloud storage objects to the index of a storage interface controller, the storage interface controller is enabled to apply data transformations at the application layer (e.g., encryption with a specific key related to a target storage object, erasure coding and compression, etc.).

Various types of connections may be used between the storage interface controller and the storage service. For instance, a storage interface controller may establish a connection structured for direct data placement, such as a remote direct memory access (RDMA) connection. This enables the storage interface controller to implement accelerator techniques, such as framing of data in hardware.

Storage interface controllers may enable network storage acceleration in various ways, in embodiments. For instance, FIG. 1 shows a block diagram of a system 100 for network storage acceleration, in accordance with an embodiment. As shown in FIG. 1, system 100 includes a user computing device 102 ("computing device 102" hereinafter), a storage infrastructure 104, and a host infrastructure 106. Each of computing device 102, storage infrastructure 104, and host infrastructure 106 are communicatively coupled via a network 108. Network 108 may comprise one or more networks such as local area networks (LANs), wide area networks (WANs), enterprise networks, the Internet, etc., and may include one or more of wired and/or wireless portions. Furthermore, network 108 may comprise one or more virtual networks. A virtual network may be established between devices or applications of storage infrastructure 104 and/or host infrastructure 106 to another. Messages sent over a virtual network may be encapsulated and transmitted over a physical network connection (e.g., using a "software-defined networking technique" or other techniques, as would be understood by a person ordinarily skilled in the relevant art(s) having benefit of this disclosure). In this context, messages sent between devices or applications over a virtual network are treated as messages sent over a private physical network. The features of system 100 are described in detail as follows.

Computing device 102 may be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. In accordance with an embodiment, computing device 102 is associated with a user (e.g., an individual user, a group of users, an organization, a family user, a customer user, an employee user, an admin user (e.g., a service team user, a developer user, a management user, etc.), etc.). Computing device 102 may access nodes of storage infrastructure 104 and/or host infrastructure 106 over network 108, as described elsewhere herein. Computing device 102 stores data and executes computer programs, applications, and/or services.

Storage infrastructure 104 and host infrastructure 106 may be network-accessible server sets (e.g., cloud-based environments or platforms). Each of storage infrastructure 104 and host infrastructure 106 may comprise one or more clusters of servers. In accordance with an embodiment, storage infrastructure 104 and/or host infrastructure 106 form a network-accessible server set (e.g., a cloud-based environment or platform). In accordance with an embodiment, storage infrastructure 104 and host infrastructure 106 are in the same cloud-based environment.

As noted above, host infrastructure 106 may comprise one or more clusters of servers. For example, as shown in FIG. 1, host infrastructure 106 comprises a host node 118. In some embodiments, host infrastructure 106 comprises additional host nodes, not shown in FIG. 1 for brevity. In this context, multiple host nodes may form a cluster of servers. In accordance with a further embodiment, host infrastructure 106 comprises multiple clusters of servers, not shown in FIG. 1 for brevity. In accordance with an embodiment, host node 118 is also referred to as a compute node.

Host node 118 may be any type of stationary or mobile processing device of host infrastructure 106 (e.g., a server or another type of computing device). In accordance with an embodiment, and as shown in FIG. 1, host node 118 executes a virtual machine 120 and comprises a storage interface controller 122 and a host node storage 124. In accordance with an embodiment, a user of computing device 102 accesses host node 118 to utilize virtual machine 120 and execute an application 126. In accordance with an embodiment, host node 118, virtual machine 120, and/or application 126 are associated with an account of a user of computing device 102.

Host node storage 124 comprises volatile memory storage devices (e.g., double data rate (DDR) memory devices, synchronous random-access memory (SRAM) devices, dynamic random-access memory (DRAM) devices, and/or the like) and/or non-volatile memory storage devices (e.g., hard drives (e.g., solid-state drives (SSDs), hybrid SSDs, hard-disk drives (HDDs), etc.), flash memory storage devices (e.g., NAND flash, NOR flash, etc.), non-volatile random-access memory (NVRAM), and/or the like). In accordance with an embodiment, data stored by host node storage 124 is accessible via storage interface controller 122, as described elsewhere herein.

Storage interface controller 122 is configured to expose storage (e.g., virtual disks of storage interface controller 122 and/or storage objects stored by storage nodes of storage infrastructure 104) to applications executed by host node 118 (e.g., application 126). Furthermore, storage interface controller 122 may be configured to utilize accelerator chips, DPU acceleration, and/or other techniques with respect to data stored by storage devices coupled to storage interface controller 122, thereby improving efficiency and/or computing performance with respect to data access operations (e.g., read and/or write operations). For instance, in accordance with an embodiment, storage interface controller 122 is a NVMe controller.

As noted above, storage interface controller 122 is configured to expose storage to applications executed by host node 118. For instance, storage interface controller 122 exposes virtual disks that map to host node storage 124. In accordance with one or more embodiments, storage interface controller 122 exposes storage objects stored by storage nodes (e.g., storage nodes 116A-116n) of storage infrastructure 104. In this context, storage interface controller 122 enables host node 118 (or applications executed thereby) to access data stored by the storage objects stored by storage nodes of storage infrastructure 104 through storage interface controller 122. Additional details regarding the exposure of storage objects by a storage interface controller, accessing data via a storage interface controller, and/or otherwise interacting with cloud storage through a storage interface controller, are described with respect to FIGS. 2 and 3B-11, as well as elsewhere herein.

As noted above, storage infrastructure 104 comprises one or more storage clusters. For example, as shown in FIG. 1, storage infrastructure 104 comprises storage clusters 114A-114n. Each of storage clusters 114A-114n may comprise a group of one or more storage nodes. For example, as shown in FIG. 1, storage cluster 114A comprises storage node 116A-116n. Each of storage nodes 116A-116n comprises a plurality of physical storage disks that are accessible via network 108 and is configured to store data associated with the applications and services managed by host node 118. Storage cluster 114n may include similar storage nodes, not shown in FIG. 1 for brevity.

As further shown in FIG. 1, storage infrastructure 104 also comprises a storage service front end 110 ("front end 110" hereinafter) and a broker 112. Front end 110 enables a user (or a user's computing device, e.g., computing device 102) and/or application (e.g., an application executing on computing device 102, application 126, etc.) to establish sessions with storage infrastructure 104.

Broker 112 is a service and/or computing device of storage infrastructure 104 that is configured to manage traffic to and/or from a cluster of storage infrastructure 104 (e.g., storage clusters 114A-114n), a storage node of storage infrastructure 104 (e.g., storage nodes 116A-116n), and/or other brokers of storage infrastructure 104 (not shown in FIG. 1 for brevity). In accordance with an embodiment, broker 112 is a sub-service of front end 110. While only a single broker is shown in FIG. 1, storage infrastructure 104 may include more than one broker. For instance, storage infrastructure 104 may comprise a broker for each cluster or a subset of clusters 114A-114n. In accordance with another embodiment, a broker of the multiple brokers manages traffic to and/or from the other brokers.

As noted above and in accordance with an embodiment, host node 118 is able to access storage objects stored by storage nodes (e.g., storage nodes 116A-116n) using storage interface controller 122. For example, application 126 (e.g., on behalf of a user of computing device 126, as part of a configuration of application 126, and/or the like) may establish a connection with a storage service of storage infrastructure 104 (e.g., via front end 110). In this context, front end 110 provides application 126 a session token that uniquely identifies the session established between application 126 and the storage service. Additional details regarding establishing sessions between applications and storage services are described with respect to FIGS. 2 and 3A.

Application 126 provides a command to storage interface controller 122, the command configured to establish a connection with a storage node of the storage service of storage infrastructure 104, the command comprising the session token. Storage interface controller 122 provides the session token to broker 112. Broker 112 determines an endpoint associated with a storage node for storage interface controller 122 to establish a connection with. Broker 112 may determine the endpoint based on information included in the command, the type of command, the type of storage nodes, the application, the session token, and/or any other information associated with storage infrastructure 104, host node 106, and/or the connection established between the storage service and application 126, as discussed elsewhere herein. In accordance with an embodiment, the determined endpoint is an endpoint of a storage node (e.g., storage nodes 116A-116n), an endpoint of another broker that manages one or more storage nodes, an endpoint of a managing device or service that manages multiple storage nodes (e.g., a table server that manages storage nodes of storage infrastructure 104, a resource manager of a storage cluster (e.g., storage clusters 114A-114n), and/or the like).

Storage interface controller 122 receives the endpoint determined by broker 112, establishes a connection with the endpoint, and maps the endpoint to a storage object stored by the storage node the endpoint is associated with. In this manner, storage interface controller 122 exposes the storage object to application 126. For instance, in accordance with an embodiment, storage interface controller 122 exposes a key of a key-value namespace of storage interface controller 122, wherein the key is mapped to the storage object and the endpoint. Thus, application 126 is able to read from and/or write to the storage object through storage interface controller 122, thereby enabling storage interface controller 122 to implement techniques to improve efficiency in accessing data stored by the storage object. Additional details regarding establishing connections between a storage interface controller and a storage service are described with respect to FIGS. 2, 3B, 7, 8, and 11.

Figure 2:
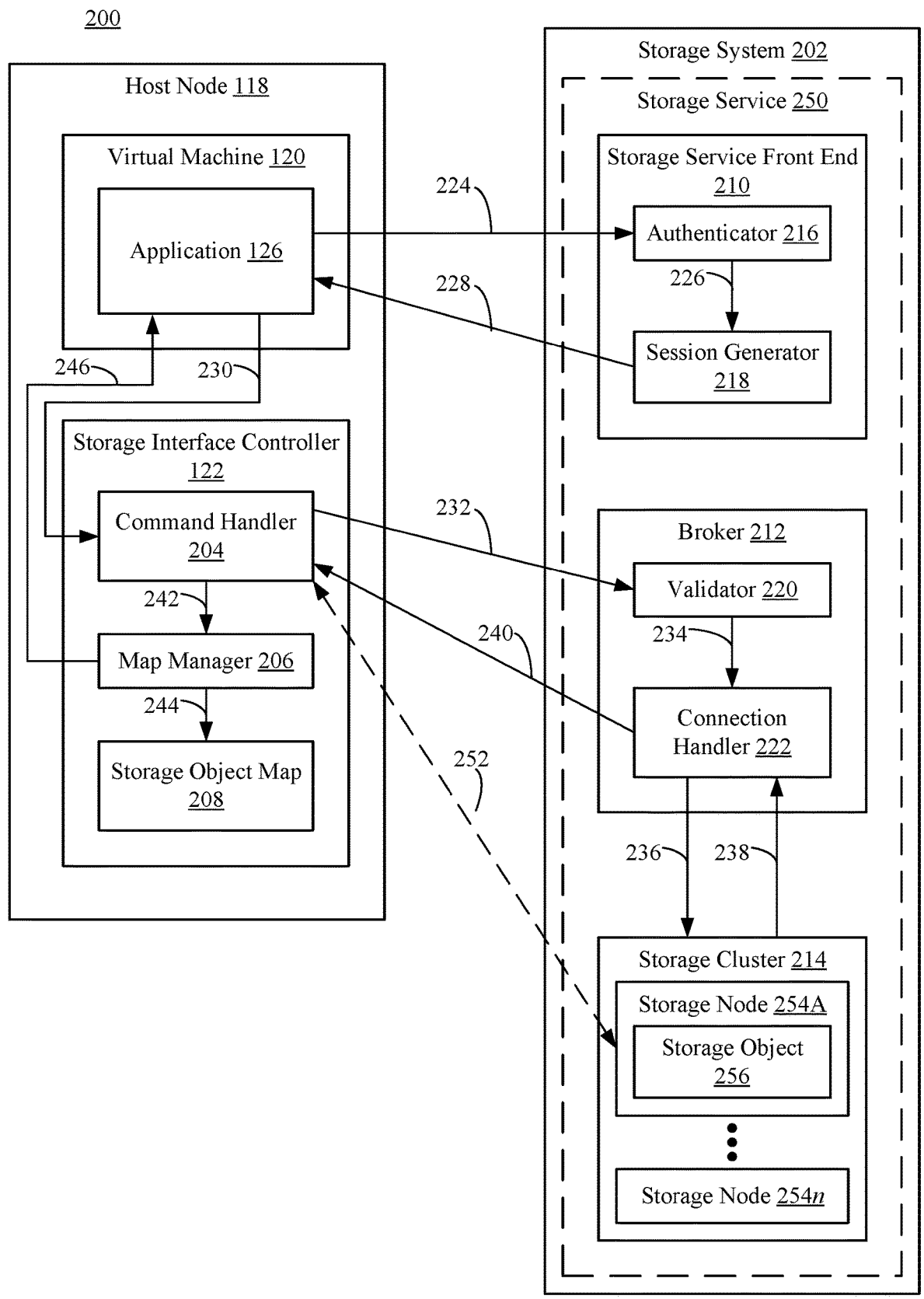
FIG. 2 shows a block diagram of another system for network storage acceleration, in accordance with an embodiment.

Front end 110 may be configured to create sessions between a storage service and a host node and storage interface controller 122 may be configured to enable network storage acceleration in various ways, in embodiments. For instance, FIG. 2 shows a block diagram of another system 200 ("system 200" hereinafter) for network storage acceleration, in accordance with an embodiment. As shown in FIG. 2, system 200 comprises host node 118 (comprising virtual machine 120 (executing application 126) and storage interface controller 122), as described with respect to FIG. 1, and a storage system 202. As also shown in FIG. 2, storage interface controller 122 comprises a command handler 204, a map manager 206, and a storage object map 208. Command handler 204 and map manager 206 are services executed by storage interface controller 122. Storage object map 208 maps storage objects to an index of storage interface controller 122. Storage system 202 is an example of storage infrastructure 104 of FIG. 1. As further shown in FIG. 2, storage system 202 comprises a storage service 250. Storage service 250 comprises a storage service front end 210 ("front end 210" hereinafter), a broker 212, and a storage cluster 214, which are further examples of front end 110, broker 112, and storage clusters 114A-114n, as respectively described with respect to FIG. 1. Front end 210 comprises an authenticator 216 and a session generator 218 and broker 212 comprises a validator 220 and a connection handler 222, each of which may be respective sub-services of front end 210 and broker 212. Storage cluster 214 comprises storage nodes 254A-254n, which are further examples of storage nodes 116A-116n, as described with respect to FIG. 1. While storage service 250 is shown in FIG. 2 comprising a single storage cluster 214, it is further contemplated herein that embodiments of storage services may comprise any number of storage clusters. Furthermore, a storage service in accordance with an embodiment comprises one or more non-clustered storage nodes. As shown in FIG. 2, storage node 254A stores a storage object 256.

Figure 3A:
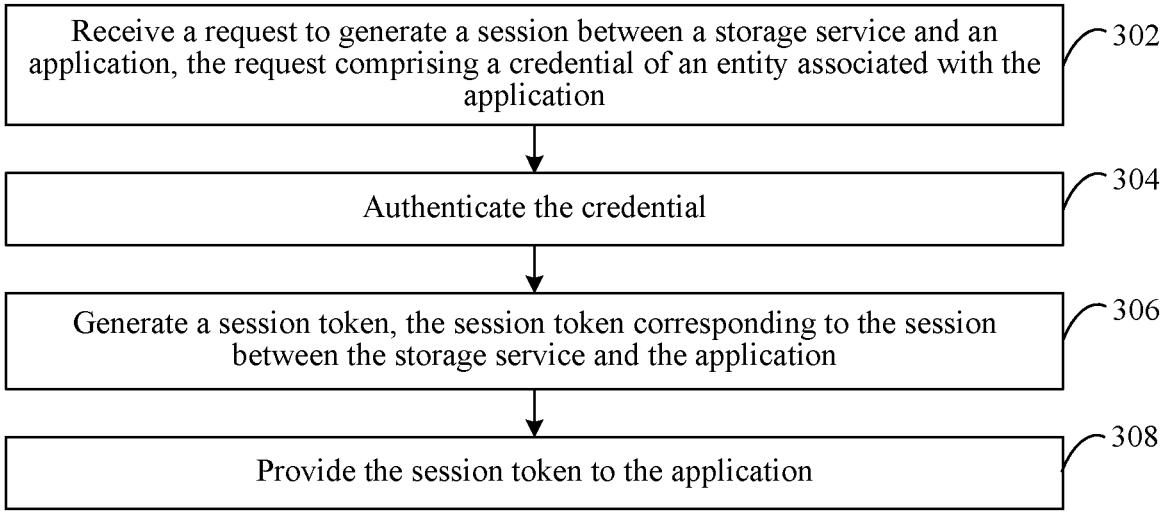
FIG. 3A shows a flowchart of a process for establishing a session between a storage service and an application, in accordance with an embodiment.

As noted above, application 126 and storage service front end 210 are configured to establish a connection with one another. To better illustrate embodiments of establishing sessions between an application and a storage service, system 200 is described with respect to FIG. 3A. FIG. 3A shows a flowchart 300A of a process for establishing a session between a storage service and an application, in accordance with an embodiment. Front end 210 may operate according to flowchart 300A in embodiments. Note that not all steps of flowchart 300A need be performed in all embodiments. Further structural and operational embodiments will be apparent to persons skilled in the relevant art(s) based on the following descriptions of FIGS. 2 and 3A.

Flowchart 300A begins with step 302. In step 302, a request to generate a session between a storage service and an application is received. The request comprises a credential of an entity associated with the application. For example, authenticator 216 of FIG. 2 receives a request 224 to generate a session between storage service 250 and application 126. The request comprises a credential of an entity associated with the application (e.g., a credential of application 126, a credential of an organization of application 126, a user of computing device 102 of FIG. 1). Request 224 may be a REST API call. For example, request 224 in accordance with an embodiment is a REST API call to create a session between application 126 and storage service 250). In a particular embodiment, request 224 is a create dataset session REST API call.

In step 304, the credential is authenticated. For example, authenticator 216 of FIG. 2 authenticates the credential included in request 224. Authenticator 216 may authenticate the credential in various ways, in embodiments. Example authentication processes include, but are not limited to, a shared key authentication process, an open authorization (OAuth) authentication process, a shared access signature (SAS) authentication process, a user delegation SAS authentication process, an access control list (ACL) authentication process, and/or any other type of authentication process that may be used to authentication a credential provided by the application. For instance, in accordance with an embodiment, authenticator 216 performs an ACL authentication process to determine if virtual machine 120 is in a valid virtual network (VNET) (e.g., based on an identifier of virtual machine 120 (a "VM ID") and an identifier of host node 118 (a "Host ID")). In accordance with an embodiment, and as shown in FIG. 2, authenticator 216 provides an indication 226 to session generator 218 indicating the credential is authenticated.

In step 306, a session token is generated. The session token corresponds to the session between the storage service and the application. For example, session generator 218 of FIG. 2 generates a session token corresponding to a session between storage service 250 and application 126. In accordance with an embodiment, session generator 218 embeds information that may be used by an application (e.g., application 126) or a storage interface controller (e.g., storage interface controller 122) to establish a connection with storage service 250 (or brokers and/or storage nodes of storage service 250). For example, session generator 218 embeds an identity of virtual machine 120, host node 118, and/or application 126 in the session token. In some embodiments, the session token is encrypted in a manner that prevents host node 118, virtual machine 120, and/or application 126 from being able to parse (i.e., decrypt) the session token. For instance, the session token may be an encrypted session generator 218 with a certificate (e.g., a regional certificate) accessible by storage service 250. In accordance with an embodiment, the session token is encrypted in a manner that enables storage interface controller 122 to parse the session token (e.g., without exposing the session token to another service or component of host node 118 (e.g., virtual machine 120). In accordance with an embodiment, session token enables access to storage nodes associated with an account of virtual machine 120 (or a user associated with virtual machine 120). In accordance with another embodiment, session token enables access to storage nodes of accounts other than the account associated with virtual machine 120. For example, a data analytics service may use a subscription account for its virtual machine while processing data stored by storage service 250 associated with other subscriptions.

In step 308, the session token is provided to the application. For example, session generator 218 of FIG. 2 provides a response 228 comprising the session token generated in step 306. Depending on the implementation, response 228 also comprises an identifier of front-end 210 (e.g., a "Front-End ID"), an identifier of the session established between application 126 and storage service 250 (e.g., a "Session ID"), an indication the session is authorized or created, and/or additional information regarding the session token and/or the session established between application 126 and storage service 250.

In accordance with an embodiment, application 126 stores the session token in a cache of host node 118. Thus, application 126 may reestablish a session with storage service 250 after the session established by front end 210 expires. Furthermore, other applications and/or virtual machines of host node 118 may utilize the session token to establish connections with storage service 250. For instance, suppose host node 118 comprised a second virtual machine executing a second application (not shown in FIG. 2 for brevity). In this example, subsequent to the first application creating a session with storage service 250, the second application may transmit a connection request to storage service 250, the connection request comprising the session token generated in step 306. In this context, authenticator 216 is configured to authenticate the request based on information included in the request (e.g., an identifier of host node 118, a secret, a certificate, etc.) and corresponding information included in the session token (e.g., the identifier of host node 118, the secret, the certificate, etc.). Alternatively, authenticator 216 is configured to authenticate the requested based on a virtual IP address of a virtual network connection established between host node 118 and front end 210.

In accordance with an embodiment, the session token includes a certificate that identifies host node 118 and/or an identifier of the virtual machine or application that initiated the first session connection (e.g., virtual machine 120 or application 126).

Figure 3B:
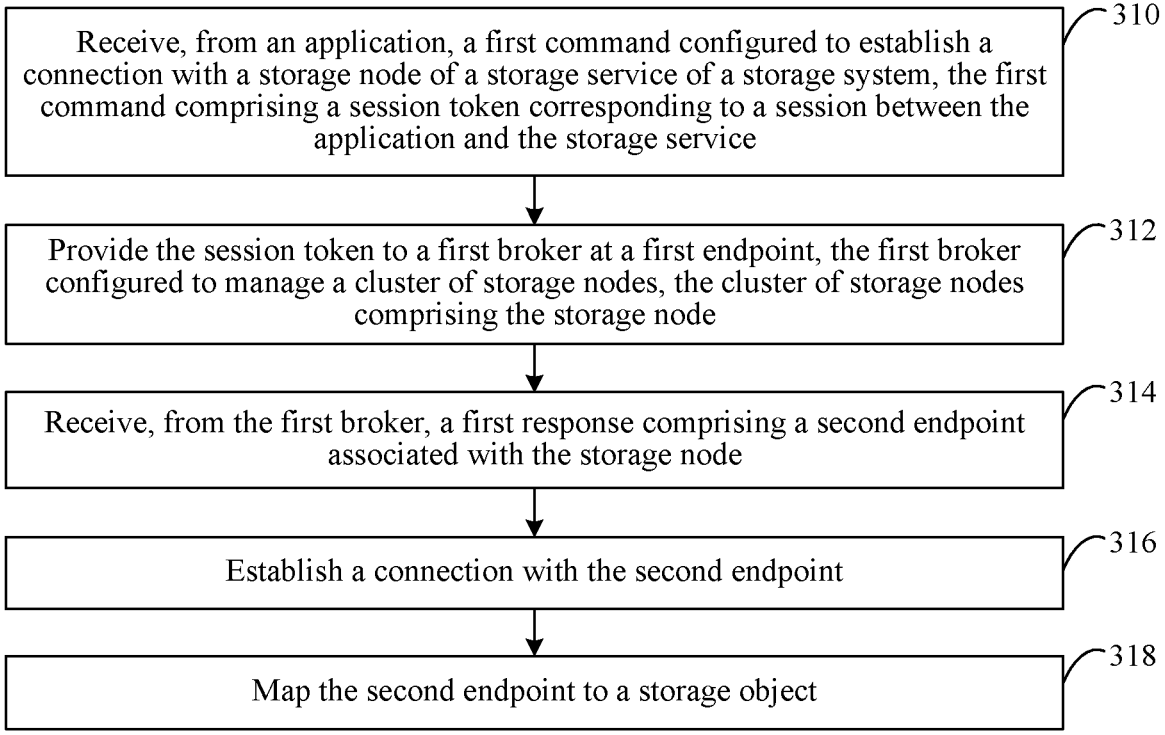
FIG. 3B shows a flowchart of a process for establishing a connection with a storage node, in accordance with an embodiment.

Once a session is established between application 126 and storage service 250, application 126 (or application 126 on behalf of a user) may request storage interface controller 122 to establish a connection with one or more storage nodes of storage system 202. To better illustrate embodiments of establishing connections with storage nodes, system 200 is described with respect to FIG. 3B. FIG. 3B shows a flowchart 300B of a process for establishing a connection with a storage node, in accordance with an embodiment. Storage interface controller 122 of FIG. 2 may operate according to flowchart 300B in embodiments. Note that not all steps of flowchart 300B need be performed in all embodiments. Further structural and operational embodiments will be apparent to persons skilled in the relevant art(s) based on the following descriptions of FIGS. 2 and 3B.

Flowchart 300B begins with step 310. In step 310, a first command is received from an application. The first command is configured to establish a connection with a storage node of a storage service of a storage system. The first command comprises a session token corresponding to a session between the application and the storage service. For example, command handler 204 of FIG. 2 receives a first command 230 ("command 230" hereinafter) from application 126. Command 230 is configured to establish a connection with a storage node (e.g., of storage nodes 254A-254n) of storage service 250. Command 230 comprises the session token generated in step 306 of flowchart 300A, as described with respect to FIG. 3A. In accordance with an embodiment, command 230 is a command to connect a session with storage service 250 (e.g., a connect command of an NVMe controller). In accordance with another embodiment, command 230 is an "open" command configured to associate a an index of storage interface controller 122 (e.g., a key in a key-value namespace of an NVMe controller) to a storage object of storage nodes 254A-254n (e.g., storage object 256). Command 230 may comprise information such as, but not limited to, information associated with a type of connection to establish with storage service 250 (e.g., an RDMA connection), an intended use of the connection (e.g., writing data to a storage object, reading data stored in the storage object, reading and writing, etc.), a data pointer to be processed by storage service 250 (e.g., a data pointer that refers to a buffer comprising a parameter of command 230 and/or the session token generated in step 306), and/or any other information or data suitable for including in a command configured to establish a connection with a storage node of a storage service of a storage system, as would be understood by a person ordinarily skilled in the relevant art(s) having benefit of this disclosure. For instance, in accordance with an embodiment the session token is (e.g., directly) included in command 230. In accordance with an alternative embodiment, command 230 comprises a data pointer that refers to a buffer comprising the session token.

In step 312, the session token is provided to a first broker at a first endpoint. The first broker is configured to manage a cluster of storage nodes, the cluster of storage nodes comprising the storage node. For example, command handler 204 provides the session token included in command 230 to broker 212 at a first endpoint as request 232. In accordance with an embodiment, request 232 is a forwarded version of command 230. In accordance with an embodiment wherein command 230 comprises a data pointer, command handler 204 includes the data in the buffer referred to by the data pointer as a data buffer of request 232. In some embodiments, the data pointer is not parsed or examined by command handler 204. In this context, command handler 204 includes the data pointer in request 232. In embodiments wherein command 230 and/or request 232 comprises a data pointer, the data pointer may refer to a buffer comprising information suitable for identifying a storage object (e.g., storage object 256) stored by storage service 250 (e.g., a universal resource identifier (URI) of the storage object, a version identifier of the storage object, an identifier of an account associated with the storage object, an encryption key, and/or any other information that may be used by storage service 250 (or a subservice thereof) to identify and/or locate the storage object).

In accordance with an embodiment, command 230 comprises the first endpoint. For instance, the first endpoint may be provided to application 126 by front end 210 in response 228. In accordance with a further embodiment, the endpoint is included in an encrypted version of the session token or an accompanying certificate. In this context, command handler 204 is configured to decrypt the session token or certificate to obtain the first endpoint. Alternatively, host node 118 may be pre-configured to direct connection requests to the endpoint of broker 212. In accordance with another embodiment, command handler 204 obtains the first endpoint from another broker of storage service 250. Additional details regarding obtaining the first endpoint are discussed with respect to FIGS. 4-5B, as well as elsewhere herein.

As shown in FIG. 2, validator 220 of broker 212 receives request 232 and authenticates the session token. In accordance with an embodiment, validator 220 authenticates the session token by decrypting the session token and comparing an identifier included in the decrypted version of the session token (e.g., a Host ID, a Virtual Machine ID, an Application ID, an account ID, and/or another suitable identifier) with an identifier included in request 232. Validator 220 provides, to connection handler 222, an indication 234 indicating that the session token is valid.

Connection handler 222 is configured to manage connections between storage nodes managed by broker 212 and storage interface controller 122. For example, connection handler 222 may analyze information included in request 232, information regarding storage clusters and/or storage nodes of storage service 250, and/or the like to determine which node(s) of storage nodes 254A-254n storage interface controller 122 is to be connected to for satisfying command 230. For instance, connection handler 222 may be configured to determine a type of endpoint based on an analysis of information included in request 232 (e.g., an identifier of the storage object (e.g., an identifier of storage object 256), a buffer referred to by a data pointer included in command 230 (and provided to broker 212 in request 232), a data pointer included in request 232, the type of connection requested in command 230, an indication of the intended use of the established connection (e.g., reading data from a storage object, writing data to a storage object, both reading and writing using the connection, etc.), and/or the like), an analysis of information regarding storage clusters (e.g., storage cluster 214) and/or storage nodes (e.g., storage nodes 254A-254n) of storage service 250 (e.g., available bandwidth of a storage node, available bandwidth of a managing service of a cluster or group of nodes, storage objects stored by the storage node, available storage space of a storage node, the number of network hops between an endpoint of the storage space or managing service and host node 118, and/or the like), and/or an analysis of any other information associated with storage service 250, host node 118, associated users and/or associated accounts that may be used to determine the type of endpoint storage interface controller 122 is to be connected to.

In a non-limiting example, connection handler 222 determines one or more endpoints of respective storage nodes that comprises a storage object (e.g., the same storage object, storage objects that store particular data, etc.). In this example, if request 232 indicates the requested connection is to be used for reading data, connection handler 222 may select one of the determined endpoints to be provided to storage interface controller 122. For example, suppose storage node 254A and storage node 254n both stored (e.g., separate copies of) storage object 256 and request 232 indicates the requested connection is to be used for reading data from storage object 256. In this example, connection handler 222 determines the endpoints of storage nodes 254A and 254n and selects one of the endpoints to be provided to storage interface controller 122.

Alternatively, in this example, if request 232 indicates the requested connection is to be used for writing data to the storage object, connection handler 222 may select an endpoint of a broker or a managing service (e.g., a resource manager or table server) that manages each of the storage nodes. For example, continuing the scenario wherein storage node 254A and storage node 254n both store (e.g., separate copies of) storage object 256, if request 232 indicates the requested connection is to be used for writing data to storage object 256, connection handler 222 determines an endpoint of a managing service that manages both storage nodes 254A and 254n (e.g., a resource manager of storage cluster 214, not shown in FIG. 2).

As another non-limiting example, connection handler 222 determines an endpoint based on the size of the storage object storage interface controller 122 is requesting a connection with (e.g., storage object 256). For instance, as shown in FIG. 2, storage object 256 is small enough to exist on storage node 254A. In this context, connection handler 222 determines the connection may be directly made with storage node 254A and selects the node. As an alternative example, suppose storage object 256 is spread across multiple nodes of storage cluster 214 (e.g., a blob storage spread across multiple storage nodes). In this example, connection handler 222 determines the connection should be made with a managing service that manages the storage nodes the storage object is spread across (e.g., a resource manager of storage cluster 214, not shown in FIG. 2).

Thus, several non-limiting examples have been described with respect to connection handler 222 determining an endpoint to which storage interface controller 122 is to establish a connection with to enable access to a storage object that satisfies command 230. Furthermore, connection handler 222 may be configured to determine the endpoint that satisfies command 230 with the least number of network hops between a storage object and host node 118. By determining an endpoint in this manner, the number of computing resources and the amount of time taken to access data stored by a storage object is reduced. For instance, as noted above (as well as elsewhere herein) connection handler 222 may determine an endpoint based on an intended use of the connection. If the intended use of a connection is to read data, connection handler 222 may be configured to determine an endpoint of a single storage node that stores the storage object and requires the fewest number of network hops between host node 118 and the storage object (e.g., a direct connection). If the intended use of a connection is to write data (or read and write data), connection handler 222 may be configured to determine an endpoint of the managing service that manages each node that stores the storage object with the fewest number of network hops needed to still access each copy of the storage object.

As shown in FIG. 2, connection handler 222 transmits a prepare command 236 to the determined storage node(s) at the determined second endpoint. Alternatively, connection handler 222 transmits prepare command 236 to a service that manages storage nodes (e.g., another broker or a managing service not shown in FIG. 2 for brevity) at the determined second endpoint. In accordance with an embodiment prepare command 236 comprises the session token and an identifier that uniquely identifies host node 118, virtual machine 120, application 126, storage interface controller 122, or the session established between application 126 and storage service 250. By including the session token and identifier(s) in this manner, the determined node(s) or managing services are able to determine if subsequent commands or requests are received are authorized (e.g., by comparing session tokens and/or identifiers included in the subsequent commands or requests with the tokens and/or identifiers included in prepare command 236. In accordance with an embodiment, and as shown in FIG. 2, the storage node(s) and/or managing services provide an indication 238 to connection handler 222 indicating prepare command 236 was received and/or fulfilled.

In step 314, a first response is received from the first broker. The first response comprises a second endpoint associated with the storage node. For example, command handler 204 of FIG. 2 receives a response 240 from connection handler 222. Response 240 comprises the second endpoint determined by connection handler 222, as described above, as well as elsewhere herein. For instance, in accordance with an embodiment, response 240 comprises a list of identifiers for each storage node of storage cluster 214 that storage interface controller 122 is to establish a connection with (e.g., for sending subsequent read and/or write commands).

In step 316, a connection is established with the second endpoint. For example, command handler 204 establishes connection 252 with the second endpoint included in response 240. As shown in FIG. 2, connection 252 is a connection with storage node 254A. In this context, the second endpoint included in response 240 is the endpoint of storage node 254A. It is also contemplated herein that command handler 204 may establish a connection with another broker that manages storage cluster 214 (not shown in FIG. 2), a connection with a managing service (e.g., a table server, a resource manager, and/or the like) of storage cluster 214 (not shown in FIG. 2), multiple connections with respective nodes (e.g., storage node 254A and storage node 254n), and/or the like. Connection 252 may comprise an RDMA connection, a TCP connection, and/or a QUIC connection. In accordance with an embodiment, connection 252 comprises a virtual network connection between the endpoint and storage interface controller 122. In accordance with an embodiment, command handler 204 establishes connection 252 with the second endpoint by transmitting a request (not shown in FIG. 2 for brevity) to the second endpoint, by performing a handshake process with the second endpoint, and/or the like. In accordance with an embodiment, a cyclical redundancy check (CRC) process is used to establish the connection.

In accordance with an embodiment, command handler 204 provides a request (not shown) to the storage node(s) and/or managing services authenticate to establish connection 252. In this context, the request comprises the session token and, optionally, an identifier that may be used to authenticate the request (e.g., a Host ID of host node 118, a Virtual Machine ID of virtual machine 120, an Application ID of application 126, an identifier of storage interface controller 122, a Session ID of the session created between application 126 and storage service 250, and/or the like). The receiving node(s) and/or services authenticate the session token and optionally one or more included identifiers and, if the token and identifier(s) are authenticated, authorizes establishment of connection 252.

As shown in FIG. 2, command handler 204 provides connection information 242 and flowchart 300B proceeds to step 318. Connection information 242 may include any information associated with storage interface controller 122, the second endpoint, the storage node(s) associated with the second endpoint, storage objects of the associated storage node(s), and/or connection 252.

In step 318, the second endpoint is mapped to a storage object. For example, map manager 206 of FIG. 2 receives connection information 242 from command handler 204 and maps the second endpoint to storage object 256 in storage object map 208 via mapping update information 244. For instance, map manager 206 may map storage object 256 (stored by storage node 254A associated with the second endpoint) to an index of storage interface controller 122 in a manner that enables applications (e.g., application 126) of host node 118 to access storage object 256 using storage interface controller 122 (e.g., for reading from and/or writing to storage object 256). In accordance with an embodiment, map manager 206 maps the second endpoint by updating a data pointer included in command 230 to identify a KV key of storage interface controller 122 for storage object 256. For instance, map manager 206 in a particular embodiment updates the data pointer to include an identifier of a namespace of storage interface controller 122 (e.g., a Namespace ID, or NSID). By mapping storage objects to second endpoints in this way, storage interface controller 122 enables subsequent commands associated with the storage object to be directed to the mapped endpoint.

As also shown in FIG. 2, map manager 206 exposes the mapping to application 126 by transmitting mapping information 246 to application 126. In this context, application 126 is able to transmit commands requesting access to storage object 256 mapped in storage object map 208 via storage interface controller 122. Thus, when accessing storage object 256 mapped in this way, storage interface controller 122 may implement techniques for accelerating storage access with respect to cloud storage, such as, but not limited to: utilizing accelerator chips; data processing unit (DPU) acceleration, and/or other techniques described elsewhere herein. In accordance with an embodiment, mapping information 246 is displayed in a graphical user interface (GUI) of application 126 (e.g., on computing device 102 of FIG. 1), thereby enabling a user to access and/or interact with the mapping of storage objects to endpoints.

III. Example Embodiments for Connecting to Storage Services

Figure 4:
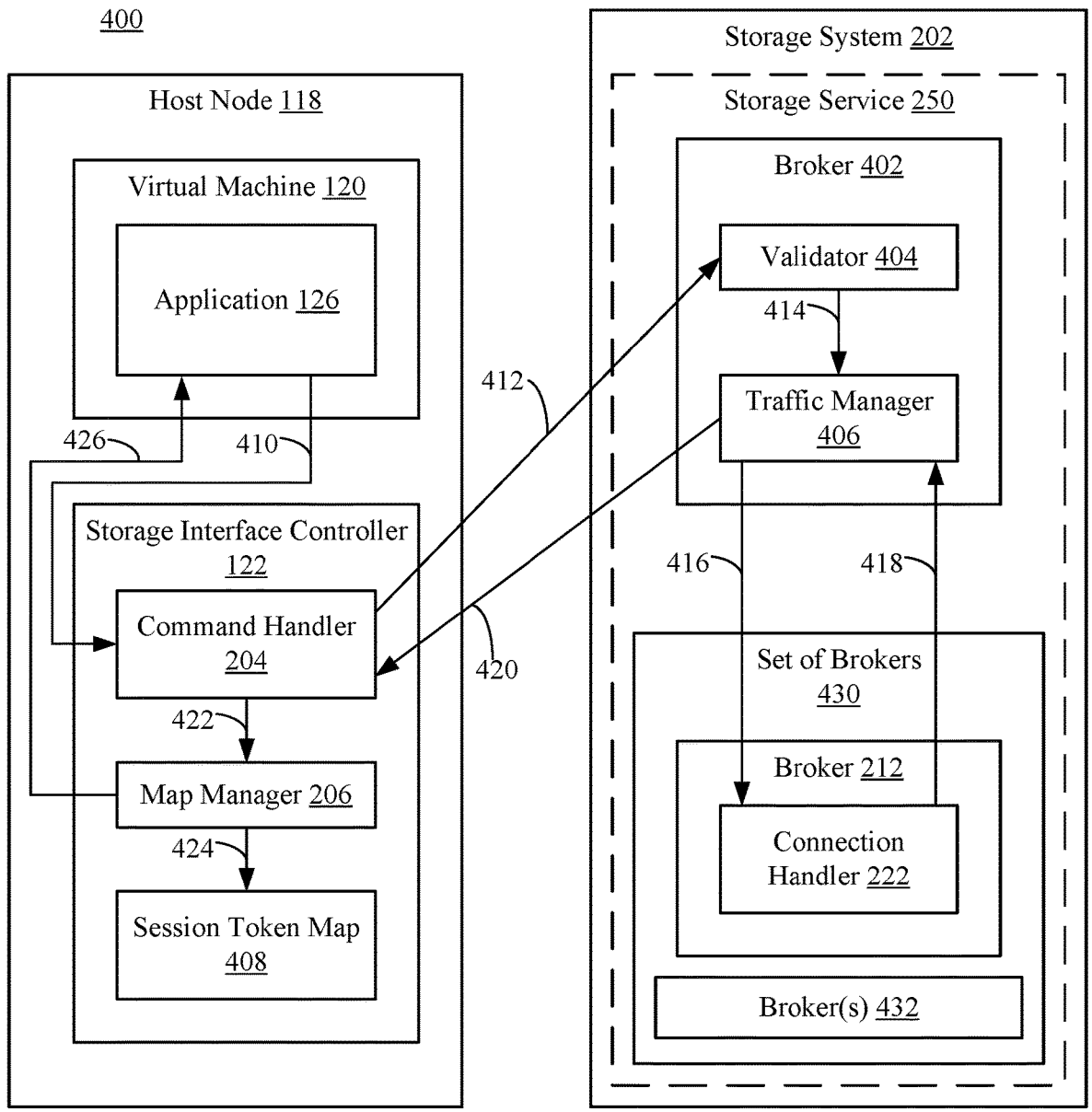
FIG. 4 shows a block diagram of a system for establishing a session between a storage service and a storage interface controller, in accordance with an embodiment.

Storage interface controllers may be configured to connect to storage services in various ways, in embodiments. In particular, storage interface controllers may establish connections with storage nodes, managing services of storage nodes, and/or brokers. For instance, as described with respect to FIG. 3B, command handler 204 of storage interface controller 122 of FIG. 2 is configured to provide a session token to broker 212 at a first endpoint. Storage interface controller 122 may be configured to determine or otherwise obtain the first endpoint in various ways, in embodiments. For example, FIG. 4 shows a block diagram of a system 400 for establishing a session between a storage service and a storage interface controller, in accordance with an embodiment. As shown in FIG. 4, system 400 comprises host node 118 (comprising virtual machine 120 (comprising application 126) and storage interface controller 122) and storage system 202 (comprising storage service 250), as described with respect to FIG. 2. As also shown in FIG. 4, storage interface controller 122 comprises command handler 204 and map manager 206, as described with respect to FIG. 2, and a session token map 408. Storage service 250 of FIG. 4 comprises a broker 402 and a set of brokers 430. Broker 402 comprises a validator 404 and a traffic manager 406. Set of brokers 430 comprises broker 212 (comprising connection handler 222), as described with respect to FIG. 2, and one or more brokers 432 ("brokers 432" hereinafter). Broker 402 is configured to manage traffic to and from set of brokers 430. As shown in FIG. 4, broker 402 is separate from set of brokers 430. Alternatively, broker 402 is included in set of brokers 430. For instance, each broker of brokers 430 may be configured to manage traffic to and from set of brokers 430, in embodiments. In accordance with an embodiment, broker 402 is a regional broker and set of brokers 430 are brokers within a region managed by broker 402.

Figure 5A:
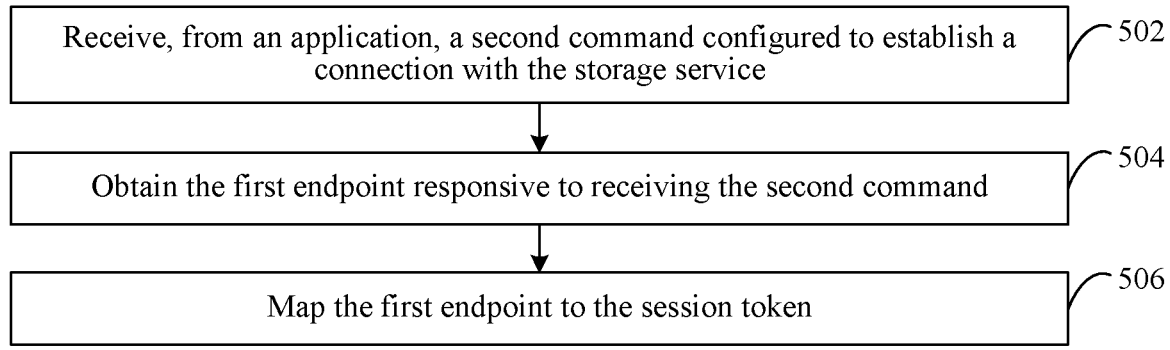
FIG. 5A shows a flowchart of a process for establishing a session between a storage service and a storage interface controller, in accordance with an embodiment.

For purposes of illustration, system 400 is described with respect to FIG. 5A. FIG. 5A shows a flowchart 500A of a process for establishing a session between a storage service and a storage interface controller, in accordance with an embodiment. Storage interface controller 122 may operate according to flowchart 500A in embodiments. In accordance with an embodiment, one or more steps of flowchart 500A are performed subsequent to the steps of flowchart 300A and prior to the steps of flowchart 300B. Note that not all steps of flowchart 500A need be performed in all embodiments. Further structural and operational embodiments will be apparent to persons skilled in the relevant art(s) based on the following descriptions of FIGS. 4 and 5A.

Flowchart 500A begins with step 502. In step 502, a second command is received from an application. The second command is configured to establish a connection with the storage service. For example, command handler 204 receives a command 410 from application 126. Command 410 is configured to establish a connection with storage service 250. Command 410 may include a session token provided to application 126 (e.g., by a front end of storage service 250, e.g., as described with respect to FIGS. 2 and 3A), an identifier of host node 118, an identifier of virtual machine 120, an identifier of application 126, an identifier of storage service 250, an identifier of the session created between application 126 and storage service 250.

In step 504, the first endpoint is obtained responsive to receiving the second command. For example, command handler 204 of FIG. 4 obtains the first endpoint (i.e., the endpoint of broker 212) and provides it to map manager 206 as connection information 422. In accordance with an embodiment, command 410 comprises the first endpoint. In this context, the endpoint may be provided to application 126 by front end 210 during or subsequent to the creation of the session between application 126 and front end 210. Alternatively, application 126, virtual machine 120, and/or host node 118 are pre-configured to direct connection requests to the first endpoint. In accordance with another embodiment, command handler 204 obtains the first endpoint from a broker that is configured to manage traffic to and from a set of brokers of storage service 250 (e.g., broker 402). Additional details regarding broker 402 are described with respect to FIG. 5B, as well as elsewhere herein.

In step 506, the first endpoint is mapped to the session token. For example, map manager 206 of FIG. 2 maps the first endpoint obtained in step 504 to the session token in session token map 408 via map update information 424. In this manner, storage interface controller 122 (or subcomponents or subservices thereof) are able to access session token map 408 to determine an endpoint to direct requests to establish a connection with a storage node of storage service 250 on behalf of application 126. As further shown in FIG. 4, map manager 206 map be configured to expose the mapping of the session token to the first endpoint via mapping information 426.

Figure 5B:
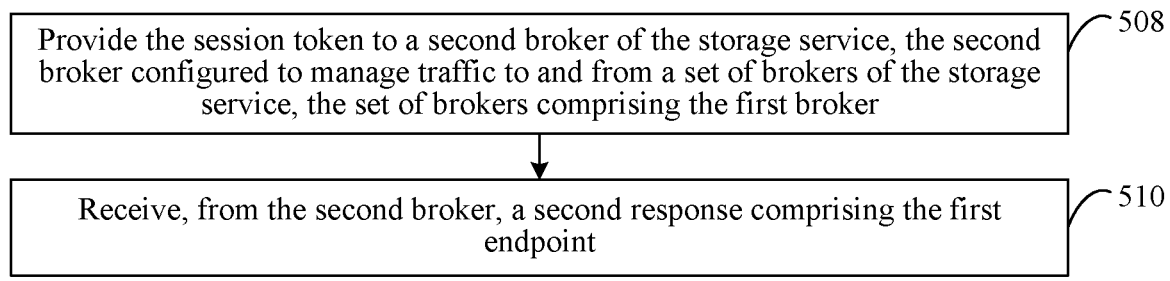
FIG. 5B shows a flowchart of a process for obtaining an endpoint, in accordance with an embodiment.

Step 504 of flowchart 500A may be performed in various ways to obtain an endpoint of a broker, in embodiments. For instance, FIG. 5B shows a flowchart 500B of a process for obtaining an endpoint, in accordance with an embodiment. Storage interface controller 122 may operate according to flowchart 500B in embodiments. Note that not all steps of flowchart 500B need be performed in all embodiments. Further structural and operational embodiments will be apparent to persons skilled in the relevant art(s) based on the following descriptions of FIGS. 4 and 5B.

Flowchart 500B begins with step 508. In step 508, the session token is provided to a second broker of the storage service. The second broker is configured to manage traffic to and from a set of brokers of the storage service, the set of brokers comprising the first broker. For example, command handler 204 of FIG. 4 provides a request 412 to broker 402 of storage service 250. Request 412 comprises the session token included in command 410, as described with respect to FIG. 5A. For instance, request 412 may include a data pointer that points to a buffer comprising the session token. In accordance with an embodiment, request 232 comprises an identifier of host node 118, an identifier of virtual machine 120, an identifier of application 126, and/or an identifier of the session established between application 126 and storage service 250.

In accordance with an embodiment, command handler 204 provides request 412 to broker 402 based on information included in command 410. For instance, command 410 may include an endpoint of broker 402. The endpoint may be provided to application 126 during or subsequent to establishing a session with storage service 250. Alternatively, host node 118, virtual machine 120, application 126, or storage interface controller 122 are pre-configured with the endpoint of broker 402. In accordance with a further embodiment, command handler 204 receives or is pre-configured with a list of endpoints of brokers including the endpoint of broker 402. In this context, each of the brokers included in the list is configured to manage traffic to or from set of brokers 430 (i.e., each of the brokers is configured to validate requests received from command handler 204 and determine an endpoint of a broker that storage interface controller 122 is to direct subsequent commands to). Storage interface controller 122 selects the endpoint of broker 402 from the list randomly, sequentially, or based on which endpoint is least frequently or least recently selected. In a further aspect, the list of endpoints of brokers comprises (e.g., some or all) brokers within set of brokers 430.

As shown in FIG. 4, validator 404 of broker 402 receives request 412 and validates the session token included therein.

Validator 404 may be configured to validate the session token in a similar manner to that described with respect to validator 220 of system 200, as described with respect to FIGS. 2 and 3B. Validator 404 provides an indication 414 to traffic manager 406 and traffic manager 406 determines an endpoint of a broker of set of brokers 430. Traffic manager 406 determines which broker of set of brokers 430 is capable of handling commands received by command handler 204 from application 126 and based on request 412. For example traffic manager 406 may determine a broker of set of brokers 430 for handling subsequent commands based on an account associated with host node 118, virtual machine 120, and/or application 126, an intended use of the connection to be established between storage interface controller 122 and storage service 250, the session token, a certificate accompanying or included in the session token, a number of network hops between a storage node that stores a requested storage object and host node 118, available bandwidth of a broker for handling the use of the requested connection, and/or any other information associated with host node 118, storage service 250, and/or the session established between application 126 and storage service 250.

For instance, as a non-limiting example, suppose front end 210 of FIG. 2 embedded an endpoint of a broker that manages a cluster of nodes associated with an account of a user of application 126 (e.g., the endpoint of broker 212). Further suppose front end 210 of FIG. 2 embedded the cluster of nodes in a regional certificate and encrypted such that access to the unencrypted version of the regional certificate was prevented except by storage service 250. In this context, command handler 204 may not have access to the unencrypted version of the regional certificate and therefore (e.g., randomly) selects the endpoint of broker 402 to provide request 412 (comprising the regional certificate) thereto. Traffic manager 406 (or another component of broker 402, e.g., validator 404 as part of validating request 412) decrypts the regional certificate and obtains the endpoint of broker 212.

As further shown in FIG. 4, traffic manager 406 is configured to transmit a connection request 416 to connection handler 222 of broker 212. For instance, subsequent to determining the endpoint of broker 212, traffic manager 406 forwards request 412 as request 416 to connection handler 222. Connection handler 222 establishes a connection with storage interface controller 122 and provides a response 418 to traffic manager 406. Response 418 in accordance with an embodiment includes an indication that a connection is established. Alternative to connection handler 222 establishing a connection, response 418 comprises an indication that storage interface controller 122 is authorized to establish a connection with broker 212. While validator 220 is not shown in FIG. 4 for brevity, it is also contemplated herein that broker 212 is configured to validate request 416 (e.g., by validating a session token included in request 415).

In step 510, a second response is received from the second broker. The second response comprises the first endpoint. For example, command handler 204 of FIG. 2 receives a response 420 from traffic manager 406. In accordance with an embodiment, response 420 comprises the endpoint of broker 212.

As noted above, in some embodiments, any of broker 402 and/or brokers of set of brokers 430 may be configured to validate request 412 and determine an endpoint to be provided in response 420. By enabling any regional broker to determine an endpoint of a broker storage interface controller 122 is to establish a connection with, storage interface controller 122 is able to locate the endpoint without requiring information other than the session token provided thereto from virtual machine 120. Moreover, new storage tenants may be added to a region and begin serving traffic for those tenants without updating a list of available regional brokers on host nodes.

Figure 6:
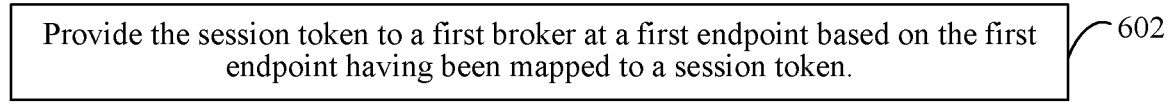
FIG. 6 shows a flowchart of a process for providing a session token to a broker, in accordance with an embodiment.

As described with respect to FIG. 5A, endpoints of brokers may be mapped to session tokens. The mapping may be used to provide session tokens to a broker. Command handler 204 of FIGS. 2 and 4 may be configured to provide a session token to broker 212 based on the mapping of the session token in various ways, in embodiments. For example, FIG. 6 shows a flowchart 600 of a process for providing a session token to a broker, in accordance with an embodiment. Command handler 204 may operate according to flowchart 500C in embodiments. Flowchart 600 is a further embodiment of step 312, as described with respect to flowchart 300B of FIG. 3B. Note that flowchart 600 need not be performed in all embodiments. Further structural and operational embodiments will be apparent to persons skilled in the relevant art(s) based on the following descriptions of FIGS. 2, 4, and 6.

Flowchart 600 comprises step 602. In step 602, the session token is provided to a first broker at a first endpoint based on the first endpoint having been mapped to a session token. For example, command handler 204 of FIG. 2 may access session token map 408 to determine the session token included in command 230 is mapped to the first endpoint of broker 212 and provide request 232 to broker 212, request 232 comprising the session token.

IV. Example Embodiments Using an Established Connection

Thus, several example embodiments of systems for enabling network storage acceleration have been described with respect to FIGS. 1-6. In these example embodiments, several types of commands for establishing connections with storage services, storage nodes, and/or managing services of nodes have been described. However, it is further contemplated herein that command handlers may receive other types of commands from applications executing on a host node. For instance, command handler 204 of FIG. 2 may receive a command from application 126 configured to close a connection with a storage node or managing service (a "close" command), disconnect a connection with storage service 250 (a "disconnect" command), read data stored in a storage object (a "read" or "retrieve" command), write data to a storage object (a "write," "store," or "append" command), and/or perform another process with respect to the storage object, an established connection, storage service 250, and/or storage interface controller 122, as described elsewhere herein. In response to a close command, storage interface controller 122 releases a mapping of an endpoint to a storage object and an index of storage interface controller 122 (e.g., a key of a key-value namespace) (e.g., as mapped in storage object map 208 of FIG. 2). In response to a disconnect command, storage interface controller 122 disconnects an existing session between the controller and storage session 250. Read, or "retrieve," commands are configured to read data stored by storage objects of storage service 250 using storage interface controller 122. Write, or "store" or "append," commands are configured to write data to storage objects stored by storage service 250 using storage interface 122.

Figure 7:
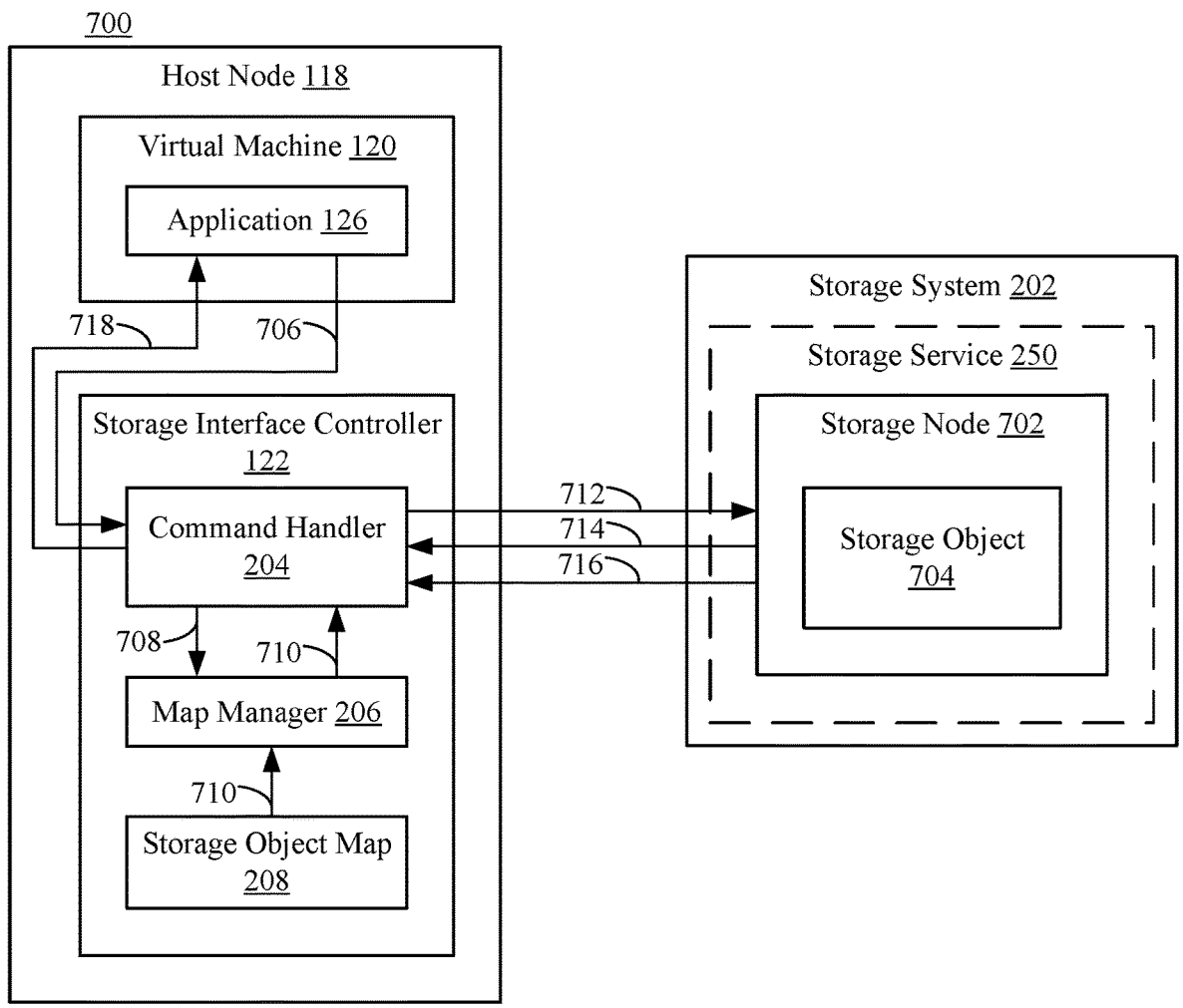
FIG. 7 shows a block diagram of a system for accessing a storage object of a storage service, in accordance with an embodiment.

In order to better illustrate an example of using an established connection between storage interface controller 122 and storage service 250 of FIG. 2, FIG. 7 is described.

FIG. 7 shows a block diagram of a system 700 for accessing data stored by a storage service, in accordance with an embodiment. As shown in FIG. 7, system 700 comprises host node 118 (comprising virtual machine 120 (executing application 126) and storage interface controller 122 (comprising command handler 204 and storage object map 208)) and storage system 202 (comprising storage service 250), as described with respect to FIG. 2. As also shown in FIG. 7, storage service 250 comprises storage node 702. Storage node 702 stores storage object 704. Suppose storage interface controller 122 establishes a connection with an endpoint of storage node 702 in a manner described with respect to FIGS. 2 and 3B, as well as elsewhere herein. Further suppose storage interface controller 122 maps storage object 704 to the endpoint and an index of storage interface controller 122 in storage object map 208.

Figure 8:
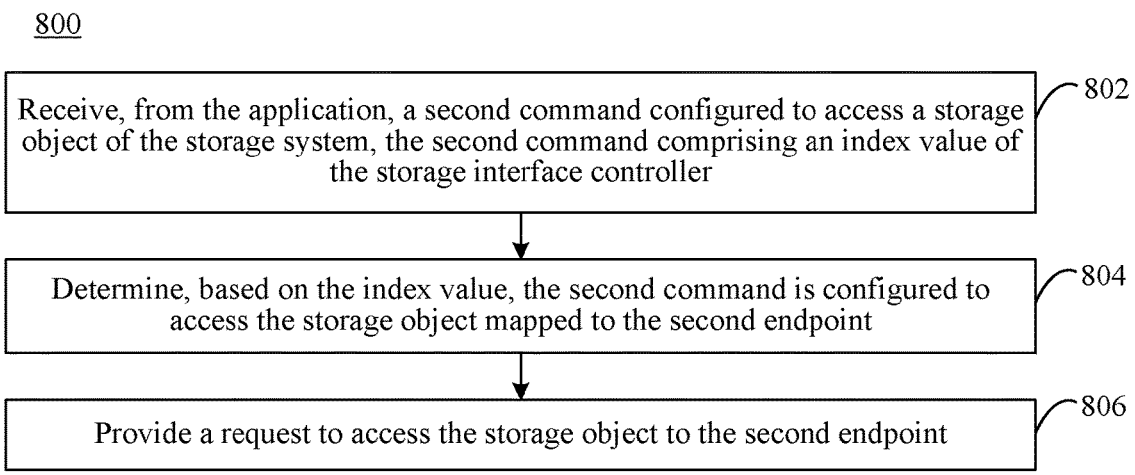
FIG. 8 shows a flowchart of a process for accessing a storage object of a storage service, in accordance with an embodiment.

For purposes of illustration, system 700 is described with respect to FIG. 8. FIG. 8 shows a flowchart 800 of a process for reading data stored by a storage system, in accordance with an embodiment. Storage interface controller 122 of system 700 may operate according to flowchart 800 in embodiments. Note not all steps of flowchart 800 need be performed in all embodiments. Further structural and operational embodiments will be apparent to persons skilled in the relevant art(s) based on the following descriptions of FIGS. 7 and 8.

Flowchart 800 begins with step 802. In step 802, a second command is received from the application. The second command is configured to access a storage object of the storage system. The second command comprising an index value of the storage interface controller. For example, command handler 204 receives a command 706 from application 126. Command 706 is configured to access storage object 704 by storage node 702 of storage service 250 of storage system 202. Command 706 comprises an index value of storage interface controller 122 (e.g., an identifier of a key of a key-value namespace of storage interface controller 122). Command 706 may also comprise a session token associated with a session established between application 126 and storage service 250 (e.g., the session token generated in step 306 of flowchart 300A, as described with respect to FIG. 3A), a data pointer that points to a buffer that receives data, a data pointer that points to a buffer that supplies data, an indicator of a command type of command 706. As a non-limiting running example, suppose command 706 is a retrieve command for retrieving data from storage interface controller 122. In this example, command 706 comprises an index value of an index of storage interface controller 122 (e.g., a namespace ID (also referred to as an NSID), a key of a key-value namespace of storage interface controller 122) associated with a storage object (e.g., storage object 704) from which data is to be retrieved, a data pointer that points to a buffer that receives the retrieved data, and an indicator that command 706 is a retrieve command.

In step 804, a determination that the second command is configured to access the storage object mapped to the second endpoint is made based on the index value. For example, command handler 204 determines, based on the index value included in command 706, that command 706 is configured to access storage object 706 mapped to the second endpoint. Command handler 204 may make this determination based on storage object map 208. For instance, as shown in FIG. 2, command handler 204 accesses storage object map 208 using map manager 206 by providing a request 708 comprising the index value to map manager 206. Map manager 206 obtains the second endpoint as map information 710 based on a mapping of the index value to the second endpoint and provides map information 710 to command handler 204. For instance, with continued reference to the running example described with respect to step 802, suppose command 706 comprises a NSID that storage interface controller 122 previously mapped to an endpoint of storage node 702 and storage object 704. In this context, command handler 204 determines (e.g., by directly accessing storage object map 208 or using map manager 206) the NSID included in command 706 is associated with (e.g., mapped to) storage node 702 and/or storage object 704. While map manager 206 is depicted in FIG. 7, it is also contemplated herein that, in an alternative embodiment, command handler 204 map accesses storage object map 208 directly to determine the index value is mapped to the second endpoint.

In step 806, a request to access the storage object is provided to the second endpoint. For example, command handler 204 provides a request 712 to access storage object 704 to storage node 702. Request 712 may include an identifier of storage object 704 (e.g., obtained from storage object map 208), the session token included in command 706, another identifier (e.g., a host ID of host node 118, a VM ID of virtual machine 120, an Application ID of application 126, an ID of storage interface controller 122, a Session ID of the session established between application 126 and storage service 250, etc.) (e.g., for use by storage node 702 in authenticating request 712, as described elsewhere herein), and/or any other information suitable for accessing storage object 704, as described elsewhere herein. Depending on the type of request (e.g., a read request, a write request, etc.), storage node 702 fulfills the request and provides a response 714 and command handler 204 provides a response 718 that indicates command 706 is fulfilled. In accordance with an embodiment, response 714 and/or response 718 comprise an identifier that uniquely identifies the request that was made (i.e., an identifier that uniquely identifies command 706).

For example, with continued reference to the non-limiting example described with respect to steps 802 and 804, and as shown in FIG. 7, request 712 is a read request to read data stored by storage object 704 (e.g., all data stored by storage object 704 or a subset of the data stored by storage object 704). In this context, storage node 702 performs a write operation 716 to write data stored by storage object 704 to storage interface controller 122 (e.g., via an RDMA write operation). Subsequent to completion of write operation 716, storage node 702 provides a response 714 to command handler 204 indicating write operation 716 is complete. Command handler 204 provides a response 718 to application 126, response 718 comprising the data written via write operation 716.

Thus, an example system and process are described with respect to FIGS. 7 and 8 for accessing a storage object of a storage system. While a running example of a retrieve command has been described with respect to FIGS. 7 and 8, it is also contemplated herein that command handler 204 may be configured to receive other commands for accessing storage object 704. For instance, command 706 may be a store command or an append command of storage interface controller 122 that is configured to write data to storage object 704. As another non-limiting example, suppose command 706 is a store command configured to write data to storage object 704. In this context, command handler 204 receives the command and determines an index value included therein is mapped to the endpoint of storage node 702 in a similar manner described above with respect to steps 802 and 804 of flowchart 800 of FIG. 8. Command handler 712 provides request 712 to storage node 702, wherein request 712 is a write request. For instance, request 712 may comprise a data pointer that points to a buffer comprising data to be written to storage object 704. Request 712 may also specify a specific location in storage object 704 in which data is to be written (e.g., by specifying a starting offset of a blob storage object or another type of storage object). Storage node 702 writes and commits data included in the buffer to storage object 704. Subsequent to completion of the write request, command handler 712 receives response 714 indicating the write request is fulfilled and command handler 204 provides response 718 to application 126 indicating store command 706 is fulfilled.

In another non-limiting example, command 706 is an append command of storage interface controller 122. In this context, command 706 is configured to write data to storage object 704 without respect to how much data is currently stored by storage object 704. In this context, command handler 204 transmits a write request to storage node 702 that causes storage node 702 to write data (included in a buffer of the request) to storage object 704 (e.g., without overwriting data and/or specifying a starting bit to write data to).

Example systems and processes have been described with respect to FIGS. 7 and 8 wherein a storage object (e.g., storage object 704) is accessed via a connection established between storage interface controller 122 and storage node 702. As described elsewhere herein, it is also contemplated herein that storage objects may be accessed using connections to endpoints other than an endpoint of a storage node. For instance, command handler 204 may access storage object 704 by transmitting requests to and receiving responses from a service of storage node 702 (e.g., another broker that manages (e.g., a cluster of nodes comprising) storage node 702, a managing service (e.g., a table server, a resource manager, and/or the like) that manages (e.g., a cluster of nodes comprising) storage node 702, and/or any other service suitable for enabling storage interface controller 122 to access storage objects stored by storage node 702). For instance, if the established connection between storage interface controller 122 and storage service 250 is to be used to write data to storage object 704, command handler 204 may be configured to transmit a write request to a managing service that is configured to write the data to multiple storage objects including storage object 704 (e.g., wherein each of the multiple storage objects comprises copies of the same data). By transmitting write requests in this manner, command handler 204 is enabled to transmit a single write request to a managing service that propagates the written data to multiple storage nodes and respective storage objects, thereby reducing network traffic between storage interface controller 122 and storage service 250 and maintaining data redundancy (e.g., in the event a storage node fails or is corrupted).

In implementations of storage interface controllers such as storage interface controller 122 of FIG. 7, an error may occur when accessing a storage object. In this context, command handler 204 may be configured to report an error code to application 126. For instance, command handler 204 may report an error code with a status code field comprising an HTTP status code and/or command-specific error information in an error code string.

V. Further Example Embodiments for Network Storage Acceleration

A. Using a Storage Object Identifier as a Key in a Key-Value Namespace

Example systems and techniques have been described herein wherein a storage interface controller maps a storage object to an endpoint associated with a storage node that stores the storage object and to an index value (such as a key in a key-value namespace of the storage interface controller). By doing so, the storage interface controller exposes the index value (e.g., as a namespace) to applications executed by a host node associated with the storage interface controller (e.g., coupled to the controller or comprising the controller). This enables applications to specify the index value in commands transmitted to the storage interface controller such that the storage interface controller accesses the storage object mapped to the index value to fulfill the command. In accordance with one or more alternative embodiments, storage interface controller receives a command from an application comprising an identifier of the storage object as a key in a key-value namespace in a manner that enables the storage interface controller to forward the command to an endpoint associated with the storage object.

Figure 9A:
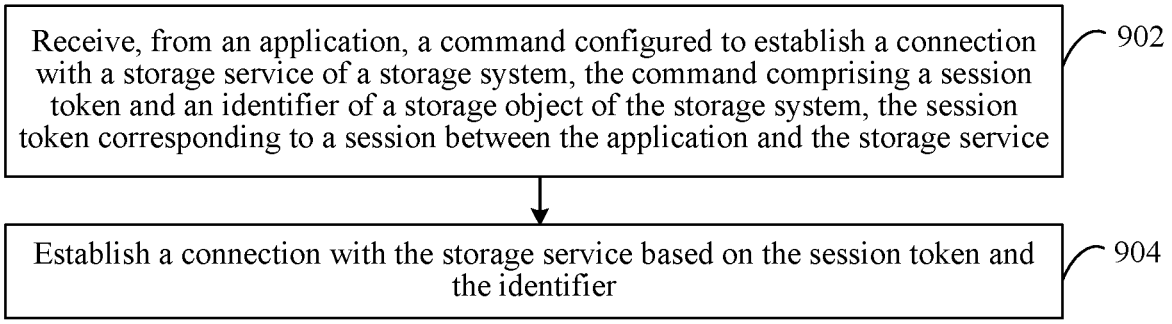
FIG. 9A shows a flowchart of a process for establishing a connection with a storage service, in accordance with another embodiment.

In this alternative embodiment, an application (e.g., application 126 of FIGS. 1 and 2) obtains an identifier of a storage object using an API call (e.g., a REST API call) of the storage service. For instance, the application may obtain a list of (e.g., all) storage objects associated with a particular account of a storage service (e.g., an account of the application, an account of an organization associated with the application, an account of an associated user, an account managed by the application, and/or the like). For example, with reference to FIG. 2, application 126 obtains a list of storage objects that are associated with an account of application 126. In this context, application 126 provides the list of storage objects to storage interface controller 122 for establishing a connection to associated storage nodes. Storage interface controllers may be configured to establish a connection to the list of endpoints in various ways, in embodiments. For example, FIG. 9A shows a flowchart 900A of a process for establishing a connection with a storage node, in accordance with another embodiment. Storage interface controller 122 of FIGS. 1 and 2 may be configured to operate according to flowchart 900A, in embodiments. Note not all steps of flowchart 900A need be performed in all embodiments. Further structural and operational embodiments will be apparent to persons skilled in the relevant art(s) based on the following description of FIG. 9A with respect to FIGS. 1 and 2.

Flowchart 900A starts with step 902. In step 902, a command is received from an application. The command is configured to establish a connection with a storage service of a storage system. The command comprises a session token and an identifier of a storage object of the storage system. The session token corresponds to a session token between the application and the storage service. For instance, with reference to FIG. 2, suppose storage interface controller 122 receives a command (not shown in FIG. 2) configured to establish a connection with storage nodes of storage cluster 214 that are associated with an account of application 126. In this context, the command comprises a session token corresponding to a session established between application 126 and storage service 250 and information that, when provided to a broker of storage service 250 (e.g., broker 212), causes the broker 212 to establish a connection with storage interface controller 122 that enables storage interface controller 122 to access storage objects associated with the account. For example, in accordance with the embodiment, the information is a list of identifiers of storage objects stored by storage nodes 254A-254n that are associated with an account of application 126 (or a user or organization associated therewith). Alternatively, the information is an identifier that uniquely identifies the account.

Figure 9B:
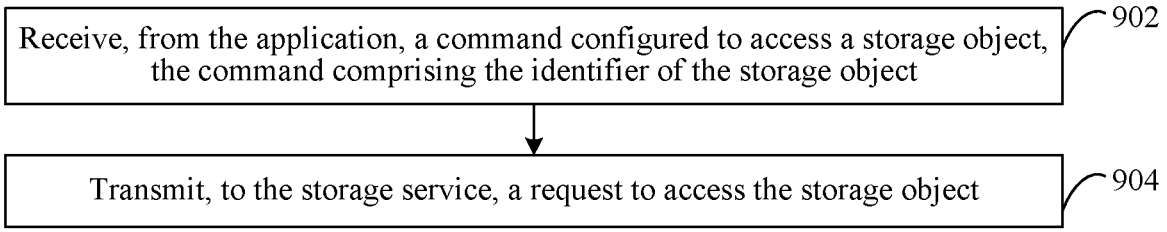
FIG. 9B shows a flowchart of a process for accessing a storage object of a storage service, in accordance with another embodiment.

In step 904, a connection is established with the storage service based on the session token and the identifier. For example, storage interface controller 122 establishes a connection with storage service 250 based on the session token and identifier of the storage object received in step 902. In accordance with an embodiment, storage interface controller 122 establishes the connection with storage service 250 by requesting a connection to be created with a broker of storage service 250 (e.g., broker 212). In this context, the endpoint of the broker may be included in the command received in step 902. For instance, front end 210 when creating the session between application 126 and storage service 250 (and the associated session token) is configured to determine the endpoint of the broker (or a managing service) that manages storage objects associated with the account. Depending on the implementation, front end 210 may initiate the establishment of the connection between storage interface controller 122 and the broker, cause the broker to initiate the establishment of the connection, cause storage interface controller 122 to initiate the establishment of the connection, or provide the determined endpoint such that, when storage interface controller 122 receives the endpoint from application 126, storage interface controller 122 initiates establishing the connection with the broker As noted above, storage interface controllers such as storage interface controller 122 of FIGS. 1 and 2 may be configured to establish a connection with a broker (or a managing service) and receive commands from application 126 that include a storage object identifier as a key in a key-value namespace of the storage interface controller. Such storage interface controllers may handle commands that include storage object identifiers in various ways, in embodiments. For example, FIG. 9B shows a flowchart 900B of a process for reading data stored by a storage node, in accordance with another embodiment. Storage interface controller 122 of FIGS. 1 and 2 may be configured to operate according to flowchart 900B, in embodiments. Note not all steps of flowchart 900B need be performed in all embodiments. Further structural and operational embodiments will be apparent to persons skilled in the relevant art(s) based on the following description of FIG. 9B with respect to FIGS. 1 and 2.

Flowchart 900B begins with step 910. In step 910, a command is received from the application. The command is configured to access a storage object of the storage service. The command comprises the identifier of the storage object. For example, suppose storage interface controller 122 of FIG. 2 (e.g., subsequent to having established a connection with a managing service of storage service 250 as described with respect to FIG. 9A) receives a command from application 126, the command configured to access storage object 256 of storage service 250 and comprising an identifier of storage object 256. In this context, the identifier of storage object 256 is used as a key of a key-value namespace of storage interface controller 122.

In step 912, a request to access the storage object is transmitted to the storage node. For example, storage interface controller 122 transmits a request to access storage object 256. Storage interface controller 122 (or a component thereof, such as command handler 204) may be configured to determine the key corresponds to a broker (e.g., broker 212) of storage service 250 and forward the command to the broker. For instance, the command may comprise an identifier of broker 212. Alternatively, storage interface controller 122 is configured to forward commands comprising storage object identifiers to a managing service in which storage interface controller 122 is connected to (e.g., a table server or a resource manager). In another alternative embodiment, storage interface controller 122 is configured to forward all commands for accessing storage (e.g., retrieve commands, store commands, append commands, and/or the like) over a connection established with storage service 250 (e.g., as described with respect to step 904 of flowchart 900A of FIG. 9A).

Thus, an example embodiment of using storage object identifiers as keys of key-value namespaces has been described with respect to FIGS. 2, 9A, and 9B. By establishing a connection with a storage service in this manner, storage interface controller 122 of FIG. 2 is able to perform storage acceleration techniques with respect to accessing storage objects of storage service 250 without mapping metadata in memory of storage interface controller 122 (e.g., as storage object map 208). This alternative embodiment reduces latency in establishing connections between storage interface controller 122 and storage service 250.

B. Hardware Controller Device

Figure 10:
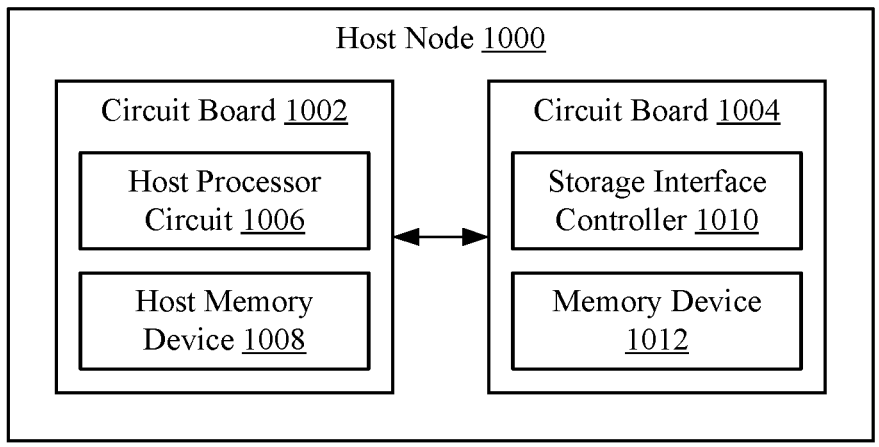
FIG. 10 shows a block diagram of a host node comprising a storage interface controller configured for network storage acceleration, in accordance with an embodiment.

Embodiments of network storage acceleration techniques have been described herein with respect to storage interface controllers (e.g., an NVMe controller). Such storage interface controllers may be configured in various ways. For example, FIG. 10 shows a block diagram of a host node 1000 comprising a storage interface controller configured for network storage acceleration, in accordance with an embodiment. Host node 1000 is an example of host node 118, as described with respect to FIG. 1, as well as elsewhere herein. As shown in FIG. 10, host node 1000 comprises a circuit board 1002 and a circuit board 1004. Circuit board 1002 comprises a host processor circuit 1006 and a host memory device 1008, each respectively mounted to circuit board 1002. Circuit board 1004 comprises a storage interface controller 1010 and a memory device 1012, each respectively mounted to circuit board 1004. Storage interface controller 1010 is a further example of storage interface controller 122, as described with respect to FIG. 1, as well as elsewhere herein. In accordance with an embodiment, circuit board 1004 is a peripheral device coupled to circuit board 1002 via a port of circuit board 1002 (not shown in FIG. 10 for brevity). For instance, as a non-limiting example, circuit board 1002 is a motherboard of host node 1000 and circuit board 1004 is a circuit board of a NVMe expansion board coupled to a port of the motherboard. While storage interface controller 1010 is shown in FIG. 10 as mounted to circuit board 1004, it is also contemplated herein that in some embodiments storage interface controller 1010 may be (e.g., directly) mounted to the same circuit board as host processor circuit 1006 (e.g., circuit board 1002)

As noted herein, circuit board 1002 comprises host memory device 1008 and circuit board 1004 comprises memory device 1012. Each of host memory device 1008 and memory device 1012 comprises one or more volatile and/or non-volatile memory devices. For instance, in accordance with an embodiment, memory device 1012 comprises one or more non-volatile memory devices of an NVMe expansion board. While FIG. 10 depicts host memory device 1008 and memory device 1012 mounted to respective circuit boards 1002 and 1004, it is contemplated herein that either of host memory device 1008 and/or memory device 1012 may be mounted to separate circuit boards (e.g., daughter boards or expansion boards). Furthermore, either of host memory device 1008 and/or memory device 1012 may be external to host node 1000 (e.g., an externally accessible memory device).

Host processor circuit 1006 is configured to execute program code stored in memory accessible to host processor circuit 1006 (e.g., program code stored in host memory device 1008, program code stored in memory device 1012 accessible via storage interface controller 1010, program code stored in a storage object of a storage service (e.g., storage service 250 of FIG. 2) accessible via storage interface controller 1010). For instance, in accordance with an embodiment, host processor circuit 1006 is configured to execute program code of application 126, as described with respect to FIG. 1 and elsewhere herein (e.g., to request a session with a storage service, to establish a session with a storage service, to maintain a session with a storage service, to send commands to storage interface controller 1010, to receive responses from storage interface controller 1010, etc.).

Storage interface controller 1010 may be configured to perform various techniques for network acceleration described herein. For instance, as noted herein, storage interface controller 1010 is a further example of storage interface controller 122. In accordance with an embodiment, storage interface controller 1010 comprises electrical circuits configured to perform one or more steps or sub-steps described herein. For instance, storage interface controller 1010 in accordance with an embodiment comprises an electrical circuit configured to perform one or more steps of the flowcharts of FIGS. 3A, 3B, 5A-6, 8-9B, and/or 11, as described elsewhere herein. In accordance with an alternative embodiment, storage interface controller 1010 comprises a processor circuit (not shown in FIG. 10 for brevity) that executes program code stored in memory accessible to storage interface controller 1010 (e.g., memory device 1012) to perform one or more steps of the flowcharts of FIGS. 3A, 3B, 5A-6, 8-9B, and/or 11, as described elsewhere herein. In accordance with another alternative embodiment, storage interface controller comprises a combination of a processor circuit that executes program code and other electrical circuits configured to perform operations to perform one or more steps of the flowcharts of FIGS. 3A, 3B, 5A-6, 8-9B, and/or 11, as described elsewhere herein.

C. Fuse Operation Embodiments

Figure 11:
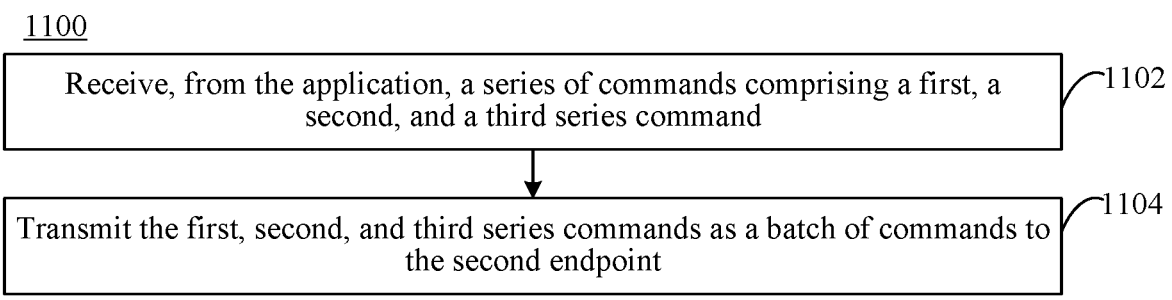
FIG. 11 shows a flowchart of a process for transmitting a series of commands, in accordance with an embodiment.

Example embodiments have been described with respect to FIGS. 7, 8, and 9B wherein a storage interface controller, such as storage interface controller 122, handles a command to access a storage object of a storage service. Depending on the implementation, storage interface controller 122 (or another component of an associated system) may be limited in how much data may be read from or written to in a single command handled by storage interface controller 122. In this context, storage interface controller 122 may receive multiple commands that correspond to a single read or write request. Storage interface controller 122 may handle multiple related commands in various ways, in embodiments. For example, FIG. 11 shows a flowchart 1100 of a process for transmitting a batch of commands, in accordance with an embodiment. Storage interface controller 122 of FIGS. 1, 2, 4, and 7 may be configured to operate according to flowchart 1100, in embodiments. Note not all steps of flowchart 1100 need be performed in all embodiments. Further structural and operational embodiments will be apparent to persons skilled in the relevant art(s) based on the following description of FIG. 11 with respect to FIG. 7.

Flowchart 1100 begins with step 1102. In step 1102, a series of commands are received from the application. The series of commands comprises a first series command, a second series command, and a third series command. The first series command comprises an indication that the first series command is first in the series of commands. The second series command comprises an indication that the second series command is intermediate in the series of commands. The third series command comprises an indication that the third series command is last in the series of commands. For example, suppose command handler 204 of FIG. 7 receives command 706 as a series of commands comprising a first series command (referred to as "Command A" and comprising an indication that it is first in the series of commands), a second series command (referred to as "Command B" and comprising an indication that it is an intermediate in the series of commands), and a third series command (referred to as "Command C" and comprising an indication that it is last in the series of commands), collectively referred to as "Commands A-C". In accordance with an embodiment, the respective indications are included in respective request memory descriptors of the respective commands that comprise respective addresses representing the start of a memory region's address space, a token that uniquely identifies a memory region, and a length (e.g., in bytes) of the memory region. In embodiments, the portion of a storage object (e.g., storage object 704) that Commands A-C is configured to access is a contiguous space within the storage object. In accordance with an embodiment, command handler 204 determines Command A is the first in a series command based on the respective included indication and begins queueing commands of the series. In response to determining the last command in the series (Command C) is received based on the respective included indication, flowchart 1100 continues to step 1104.

In step 1104, the first, second, and third series commands are transmitted as a batch of commands to the second endpoint. For example, command handler 204 of FIG. 7 transmits Commands A-C to storage node 702 as a batch of commands in request 712 (e.g., as a single receive command to storage node 702), also referred to as "fused" commands. In this context, a single transaction is handled by storage node 702.

By enabling application 126 to transmit a series of commands including intermediate commands, embodiments described herein enable strings of any number of fused commands. Therefore, storage interface controller 122 is able to handle read requests (e.g., receive commands) and write requests (e.g., store or append commands) with respect to data beyond limitations storage interface controller 122 has with respect to a single command (e.g., a maximum transfer size of storage interface controller 122). Furthermore, while only three series commands are described with respect to FIG. 11 (Command A, Command B, and Command C), it is contemplated herein that storage interface controller 122 may be configured to handle any number of series of commands (e.g., two commands, greater than two commands, tens of commands, hundreds of commands, or even greater numbers).

D. Storage Interface Controller Emulators

Embodiments of network storage acceleration techniques have been described herein with respect to storage interface controllers (e.g., an NVMe controller). It is also contemplated herein that one or more of the network storage acceleration techniques described herein may be performed by a service executing on a computing device that is configured to emulate a storage interface controller (e.g., a storage interface controller emulator). For instance, in accordance with an embodiment, an emulation service executing on a computing device emulates an NVMe controller configured to provide network storage acceleration, as described elsewhere herein.

E. Storage Interface Controller Token Authentication

In example embodiments described with respect to FIG. 3A, the session token is encrypted in a manner that prevents the application from accessing an unencrypted version of the session token. In the context of FIGS. 2 and 3A-3B, brokers of storage system 202 are able to decrypt and authenticate the session token. It is also contemplated herein that storage interface controllers, such as storage interface controller 122, may be configured to decrypt and authenticate the session token. For instance, a command handler of storage interface controller may include a token validator component that operates in a similar manner to validator 220 of broker 212 of FIG. 2. In this context, the token validator of the command handler is configured in a manner that enables a storage interface controller to decrypt and authenticate the session token without exposing the decrypted version of the session token to another component of or service executed by the host node associated with the storage interface controller.

VI. Example Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 12:
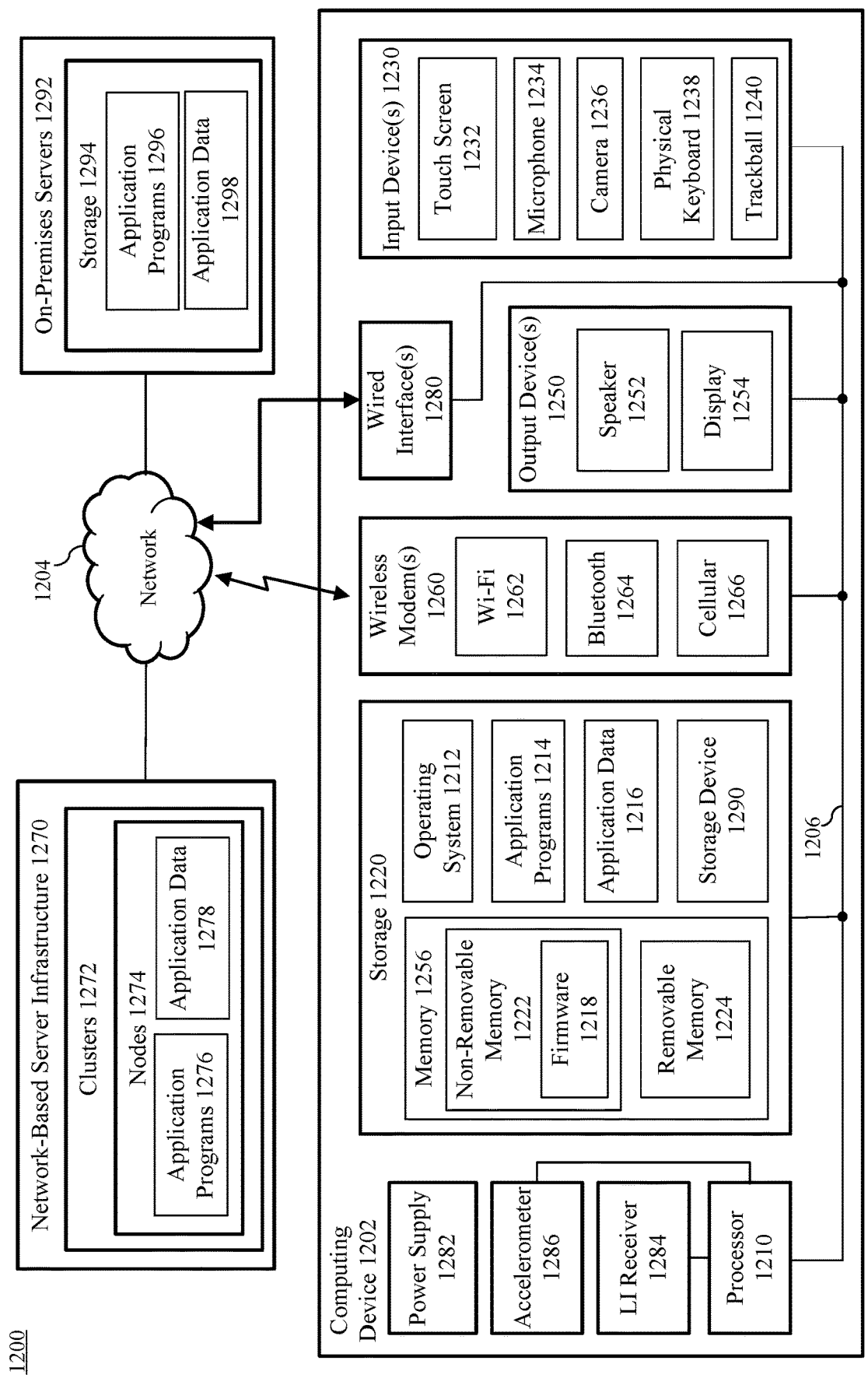
FIG. 12 shows a block diagram of an example computing system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 12. FIG. 12 shows a block diagram of an exemplary computing environment 1200 that includes a computing device 1202. Computing device 1202 is an example of computing device 102, storage infrastructure 104, storage node 116A, storage node 116n, host node 118 and/or storage interface controller 122 of FIG. 1, storage system 202 storage node 254A, and/or storage node 254n of FIG. 2, storage node 702 of FIG. 7, and/or host node 1000 and/or storage interface controller 1010 of FIG. 10, each of which may include one or more of the components of computing device 1202. In some embodiments, computing device 1202 is communicatively coupled with devices (not shown in FIG. 12) external to computing environment 1200 via network 1204. Network 1204 is an example of network 108 of FIG. 1 and comprises one or more networks such as local area networks (LANs), wide area networks (WANs), enterprise networks, the Internet, etc., and may include one or more wired and/or wireless portions. Network 1204 may additionally or alternatively include a cellular network for cellular communications. Computing device 1202 is described in detail as follows.

Computing device 1202 can be any of a variety of types of computing devices. For example, computing device 1202 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1202 may alternatively be a stationary computing device such as a desktop computer, a personal computer (PC), a stationary server device, a minicomputer, a mainframe, a supercomputer, etc.

As shown in FIG. 12, computing device 1202 includes a variety of hardware and software components, including a processor 1210, a storage 1220, one or more input devices 1230, one or more output devices 1250, one or more wireless modems 1260, one or more wired interfaces 1280, a power supply 1282, a location information (LI) receiver 1284, and an accelerometer 1286. Storage 1220 includes memory 1256, which includes non-removable memory 1222 and removable memory 1224, and a storage device 1290. Storage 1220 also stores an operating system 1212, application programs 1214, and application data 1216. Wireless modem(s) 1260 include a Wi-Fi modem 1262, a Bluetooth modem 1264, and a cellular modem 1266. Output device(s) 1250 includes a speaker 1252 and a display 1254. Input device(s) 1230 includes a touch screen 1232, a microphone 1234, a camera 1236, a physical keyboard 1238, and a trackball 1240. Not all components of computing device 1202 shown in FIG. 12 are present in all embodiments, additional components not shown may be present, and any combination of the components may be present in a particular embodiment. These components of computing device 1202 are described as follows.

A single processor 1210 (e.g., central processing unit (CPU), microcontroller, a microprocessor, signal processor, ASIC (application specific integrated circuit), and/or other physical hardware processor circuit) or multiple processors 1210 may be present in computing device 1202 for performing such tasks as program execution, signal coding, data processing, input/output processing, power control, and/or other functions. Processor 1210 may be a single-core or multi-core processor, and each processor core may be single-threaded or multithreaded (to provide multiple threads of execution concurrently). Processor 1210 is configured to execute program code stored in a computer readable medium, such as program code of operating system 1212 and application programs 1214 stored in storage 1220. Operating system 1212 controls the allocation and usage of the components of computing device 1202 and provides support for one or more application programs 1214 (also referred to as "applications" or "apps"). Application programs 1214 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1202 can communicate with any other component according to function, although not all connections are shown for ease of illustration. For instance, as shown in FIG. 12, bus 1206 is a multiple signal line communication medium (e.g., conductive traces in silicon, metal traces along a motherboard, wires, etc.) that may be present to communicatively couple processor 1210 to various other components of computing device 1202, although in other embodiments, an alternative bus, further buses, and/or one or more individual signal lines may be present to communicatively couple components. Bus 1206 represents one or more of any of several types of bus structures, including a memory bus or memory controller, a peripheral bus, an accelerated graphics port, and a processor or local bus using any of a variety of bus architectures.

Storage 1220 is physical storage that includes one or both of memory 1256 and storage device 1290, which store operating system 1212, application programs 1214, and application data 1216 according to any distribution. Non-removable memory 1222 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1222 may include main memory and may be separate from or fabricated in a same integrated circuit as processor 1210. As shown in FIG. 12, non-removable memory 1222 stores firmware 1218, which may be present to provide low-level control of hardware. Examples of firmware 1218 include BIOS (Basic Input/Output System, such as on personal computers) and boot firmware (e.g., on smart phones). Removable memory 1224 may be inserted into a receptacle of or otherwise coupled to computing device 1202 and can be removed by a user from computing device 1202. Removable memory 1224 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1290 may be present that are internal and/or external to a housing of computing device 1202 and may or may not be removable. Examples of storage device 1290 include a hard disk drive, a SSD, a thumb drive (e.g., a USB (Universal Serial Bus) flash drive), or other physical storage device.

One or more programs may be stored in storage 1220. Such programs include operating system 1212, one or more application programs 1214, and other program modules and program data. Examples of such application programs may include, for example, computer program logic (e.g., computer program code/instructions) for implementing one or more of storage service front end 110, broker 112, virtual machine 120, storage interface controller 122, application 126, command handler 204, map manager 206, storage service front end 210, broker 212, authenticator 216, session generator 218, validator 220, connection handler 222, storage service 250, broker 402, validator 404, traffic manager 406, set of brokers 430, brokers 432, and/or storage interface controller 1010 along with any components and/or subcomponents thereof, as well as the flowcharts/flow diagrams (e.g., flowcharts 300A, 300B, 500A, 500B, 600, 800, 900A, 900B, and/or 1100) described herein, including portions thereof, and/or further examples described herein.

Storage 1220 also stores data used and/or generated by operating system 1212 and application programs 1214 as application data 1216. Examples of application data 1216 include web pages, text, images, tables, sound files, video data, and other data, which may also be sent to and/or received from one or more network servers or other devices via one or more wired or wireless networks. Storage 1220 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1202 through one or more input devices 1230 and may receive information from computing device 1202 through one or more output devices 1250. Input device(s) 1230 may include one or more of touch screen 1232, microphone 1234, camera 1236, physical keyboard 1238 and/or trackball 1240 and output device(s) 1250 may include one or more of speaker 1252 and display 1254. Each of input device(s) 1230 and output device(s) 1250 may be integral to computing device 1202 (e.g., built into a housing of computing device 1202) or external to computing device 1202 (e.g., communicatively coupled wired or wirelessly to computing device 1202 via wired interface(s) 1280 and/or wireless modem(s) 1260). Further input devices 1230 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1254 may display information, as well as operating as touch screen 1232 by receiving user commands and/or other information (e.g., by touch, finger gestures, virtual keyboard, etc.) as a user interface. Any number of each type of input device(s) 1230 and output device(s) 1250 may be present, including multiple microphones 1234, multiple cameras 1236, multiple speakers 1252, and/or multiple displays 1254.

One or more wireless modems 1260 can be coupled to antenna(s) (not shown) of computing device 1202 and can support two-way communications between processor 1210 and devices external to computing device 1202 through network 1204, as would be understood to persons skilled in the relevant art(s). Wireless modem 1260 is shown generically and can include a cellular modem 1266 for communicating with one or more cellular networks, such as a GSM network for data and voice communications within a single cellular network, between cellular networks, or between the mobile device and a public switched telephone network (PSTN). Wireless modem 1260 may also or alternatively include other radio-based modem types, such as a Bluetooth modem 1264 (also referred to as a "Bluetooth device") and/or Wi-Fi 1262 modem (also referred to as an "wireless adaptor"). Wi-Fi modem 1262 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1264 is configured to communicate with another Bluetooth-capable device according to the Bluetooth short-range wireless technology standard(s) such as IEEE 802.15.1 and/or managed by the Bluetooth Special Interest Group (SIG).

Computing device 1202 can further include power supply 1282, LI receiver 1284, accelerometer 1286, and/or one or more wired interfaces 1280. Example wired interfaces 1280 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1280 of computing device 1202 provide for wired connections between computing device 1202 and network 1204, or between computing device 1202 and one or more devices/peripherals when such devices/peripherals are external to computing device 1202 (e.g., a pointing device, display 1254, speaker 1252, camera 1236, physical keyboard 1238, etc.). Power supply 1282 is configured to supply power to each of the components of computing device 1202 and may receive power from a battery internal to computing device 1202, and/or from a power cord plugged into a power port of computing device 1202 (e.g., a USB port, an A/C power port). LI receiver 1284 may be used for location determination of computing device 1202 and may include a satellite navigation receiver such as a Global Positioning System (GPS) receiver or may include other type of location determiner configured to determine location of computing device 1202 based on received information (e.g., using cell tower triangulation, etc.). Accelerometer 1286 may be present to determine an orientation of computing device 1202.

Note that the illustrated components of computing device 1202 are not required or all-inclusive, and fewer or greater numbers of components may be present as would be recognized by one skilled in the art. For example, computing device 1202 may also include one or more of a gyroscope, barometer, proximity sensor, ambient light sensor, digital compass, etc. Processor 1210 and memory 1256 may be co-located in a same semiconductor device package, such as being included together in an integrated circuit chip, FPGA, or system-on-chip (SOC), optionally along with further components of computing device 1202.

In embodiments, computing device 1202 is configured to implement any of the above-described features of flowcharts herein. Computer program logic for performing any of the operations, steps, and/or functions described herein may be stored in storage 1220 and executed by processor 1210.

In some embodiments, server infrastructure 1270 may be present in computing environment 1200 and may be communicatively coupled with computing device 1202 via network 1204. Server infrastructure 1270, when present, may be a network-accessible server set (e.g., a cloud computing platform). As shown in FIG. 12, server infrastructure 1270 includes clusters 1272. Each of clusters 1272 may comprise a group of one or more compute nodes and/or a group of one or more storage nodes. For example, as shown in FIG. 12, cluster 1272 includes nodes 1274. Each of nodes 1274 are accessible via network 1204 (e.g., in a "cloud computing platform" or "cloud-based" embodiment) to build, deploy, and manage applications and services. Any of nodes 1274 may be a storage node that comprises a plurality of physical storage disks, SSDs, and/or other physical storage devices that are accessible via network 1204 and are configured to store data associated with the applications and services managed by nodes 1274. For example, as shown in FIG. 12, nodes 1274 may store application data 1278.

Each of nodes 1274 may, as a compute node, comprise one or more server computers, server systems, and/or computing devices. For instance, a node 1274 may include one or more of the components of computing device 1202 disclosed herein. Each of nodes 1274 may be configured to execute one or more software applications (or "applications") and/or services and/or manage hardware resources (e.g., processors, memory, etc.), which may be utilized by users (e.g., customers) of the network-accessible server set. For example, as shown in FIG. 12, nodes 1274 may operate application programs 1276. In an implementation, a node of nodes 1274 may operate or comprise one or more virtual machines, with each virtual machine emulating a system architecture (e.g., an operating system), in an isolated manner, upon which applications such as application programs 1276 may be executed.

In an embodiment, one or more of clusters 1272 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1272 may be a datacenter in a distributed collection of datacenters. In embodiments, exemplary computing environment 1200 comprises part of a cloud-based platform such as Amazon Web Services® of Amazon Web Services, Inc., or Google Cloud Platform™ of Google LLC, although these are only examples and are not intended to be limiting.

In an embodiment, computing device 1202 may access application programs 1276 for execution in any manner, such as by a client application and/or a browser at computing device 1202. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1202 may additionally and/or alternatively synchronize copies of application programs 1214 and/or application data 1216 to be stored at network-based server infrastructure 1270 as application programs 1276 and/or application data 1278. For instance, operating system 1212 and/or application programs 1214 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1220 at network-based server infrastructure 1270.

In some embodiments, on-premises servers 1292 may be present in computing environment 1200 and may be communicatively coupled with computing device 1202 via network 1204. On-premises servers 1292, when present, are hosted within an organization's infrastructure and, in many cases, physically onsite of a facility of that organization. On-premises servers 1292 are controlled, administered, and maintained by IT (Information Technology) personnel of the organization or an IT partner to the organization. Application data 1298 may be shared by on-premises servers 1292 between computing devices of the organization, including computing device 1202 (when part of an organization) through a local network of the organization, and/or through further networks accessible to the organization (including the Internet). Furthermore, on-premises servers 1292 may serve applications such as application programs 1296 to the computing devices of the organization, including computing device 1202. Accordingly, on-premises servers 1292 may include storage 1294 (which includes one or more physical storage devices such as storage disks and/or SSDs) for storage of application programs 1296 and application data 1298 and may include one or more processors for execution of application programs 1296. Still further, computing device 1202 may be configured to synchronize copies of application programs 1214 and/or application data 1216 for backup storage at on-premises servers 1292 as application programs 1296 and/or application data 1298.

Embodiments described herein may be implemented in one or more of computing device 1202, network-based server infrastructure 1270, and on-premises servers 1292. For example, in some embodiments, computing device 1202 may be used to implement systems, clients, or devices, or components/subcomponents thereof, disclosed elsewhere herein. In other embodiments, a combination of computing device 1202, network-based server infrastructure 1270, and/or on-premises servers 1292 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1220. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1214) may be stored in storage 1220. Such computer programs may also be received via wired interface(s) 1280 and/or wireless modem(s) 1260 over network 1204. Such computer programs, when executed or loaded by an application, enable computing device 1202 to implement features of embodiments discussed herein. Accordingly, such computer programs represent controllers of the computing device 1202.

Embodiments are also directed to computer program products comprising computer code or instructions stored on any computer-readable medium or computer-readable storage medium. Such computer program products include the physical storage of storage 1220 as well as further physical storage types.

VII. Additional Exemplary Embodiments

A system is described herein. The system comprises a circuit board and a storage interface controller mounted to the circuit board. The storage interface controller is configured to: receive, from an application, a first command configured to establish a connection with a storage node of a storage service of a storage system, the first command comprising a session token corresponding to a session between the application and the storage service; provide the session token to a first broker at a first endpoint, the first broker configured to manage a cluster of storage nodes, the cluster of storage nodes comprising the storage node; receive, from the first broker, a first response comprising a second endpoint associated with the storage node; establish a connection with the second endpoint; and map the second endpoint to a storage object.

In an implementation of the foregoing system, the storage interface controller is further configured to: prior to the receipt of the first command: receive, from the application, a second command configured to establish a connection with the storage service, responsive to the receipt of the second command, obtain the first endpoint, and map the first endpoint to the session token; and provide the session token to the first broker based on the first endpoint having been mapped to the session token.

In an implementation of the foregoing system, to obtain the first endpoint, the storage interface controller is further configured to: provide the session token to a second broker of the storage service, the second broker configured to manage traffic to and from a set of brokers of the storage service, the set of brokers comprising the first broker; and receive, from the second broker, a second response comprising the first endpoint.

In an implementation of the foregoing system, the second broker is a regional broker and the set of brokers are brokers within a region managed by the second broker.

In an implementation of the foregoing system, to provide the session token to a second broker, the storage interface controller is further configured to randomly select the second broker from among brokers of the storage service.

In an implementation of the foregoing system, the storage interface controller is a non-volatile memory express (NVMe) controller.

In an implementation of the foregoing system, the storage interface controller is further configured to: receive, from the application, a series of commands comprising: a first series command comprising an indication that the first series command is first in the series of commands, a second series command comprising an indication that the second series command is intermediate in the series of commands, and a third series command comprising an indication that the third series command is last in the series of commands; and transmit the first, second, and third series commands as a batch of commands to the second endpoint.

In an implementation of the foregoing system, the first command indicates the connection is to be established for: reading data stored by the storage system or writing data to the storage system.

In an implementation of the foregoing system, the second endpoint comprises: an endpoint of the storage node; an endpoint of a managing service associated with the storage node; or an endpoint of a second broker that manages the storage node.

A method implemented by a storage interface controller of a computing device is described herein. The method comprises: receiving, from an application, a first command configured to establish a connection with a storage node of a storage service of a storage system, the first command comprising a session token corresponding to a session between the application and the storage service; providing the session token to a first broker at a first endpoint, the first broker configured to manage a cluster of storage nodes, the cluster of storage nodes comprising the storage node; receiving, from the first broker, a first response comprising a second endpoint associated with the storage node; establishing a connection with the second endpoint; and mapping the second endpoint to a storage object.

In an implementation of the foregoing method, the method further comprises: prior to receiving the first command: receiving, from the application, a second command configured to establish a connection with the storage service, responsive to receiving the second command, obtaining the first endpoint, and mapping the first endpoint to the session token; and wherein said providing the session token to a first broker is based on the first endpoint having been mapped to the session token.

In an implementation of the foregoing method, said obtaining the first endpoint comprises: providing the session token to a second broker of the storage service, the second broker configured to manage traffic to and from a set of brokers of the storage service, the set of brokers comprising the first broker; and receiving, from the second broker, a second response comprising the first endpoint.

In an implementation of the foregoing method, the second broker is a regional broker and the set of brokers are brokers within a region managed by the second broker.

In an implementation of the foregoing method, said providing the session token to a second broker comprises randomly selecting the second broker from among brokers of the storage service.

In an implementation of the foregoing method, said establishing a connection with the second endpoint comprises: establishing a remote direct memory access (RDMA) connection with the second endpoint; establishing a transmission control protocol (TCP) connection with the second endpoint; or establishing a QUIC connection with the second endpoint.

In an implementation of the foregoing method, the method further comprises: receiving, from the application, a series of commands comprising: a first series command comprising an indication that the first series command is first in the series of commands, a second series command comprising an indication that the second series command is intermediate in the series of commands, and a third series command comprising an indication that the third series command is last in the series of commands; and transmitting the first, second, and third series commands as a batch of commands to the second endpoint.

In an implementation of the foregoing method, the first command indicates the connection is to be established for: reading data stored by the storage system or writing data to the storage system.

In an implementation of the foregoing method, the second endpoint comprises: an endpoint of the storage node; an endpoint of a managing service associated with the storage node; or an endpoint of a second broker that manages the storage node.

A computer-readable storage medium is described herein. The computer-readable storage medium encoded with program instructions that, when executed by a processor circuit, performs a method. The method comprising: receiving, from an application, a first command configured to establish a connection with a storage node of a storage service of a storage system, the first command comprising a session token corresponding to a session between the application and the storage service; providing the session token to a first broker at a first endpoint, the first broker configured to manage a cluster of storage nodes, the cluster of storage nodes comprising the storage node; receiving, from the first broker, a first response comprising a second endpoint associated with the storage node; establishing a connection with the second endpoint; and mapping the second endpoint to a storage object.

In an implementation of the foregoing computer-readable storage medium, the method further comprises: prior to receiving the first command: receiving, from the application, a second command configured to establish a connection with the storage service, responsive to receiving the second command, obtaining the first endpoint, and mapping the first endpoint to the session token; and wherein said providing the session token to a first broker is based on the first endpoint having been mapped to the session token.

In an implementation of the foregoing computer-readable storage medium, said obtaining the first endpoint comprises: providing the session token to a second broker of the storage service, the second broker configured to manage traffic to and from a set of brokers of the storage service, the set of brokers comprising the first broker; and receiving, from the second broker, a second response comprising the first endpoint.

In an implementation of the foregoing computer-readable storage medium, the second broker is a regional broker and the set of brokers are brokers within a region managed by the second broker.

In an implementation of the foregoing computer-readable storage medium, said providing the session token to a second broker comprises randomly selecting the second broker from among brokers of the storage service.

In an implementation of the foregoing computer-readable storage medium, said establishing a connection with the second endpoint comprises: establishing a remote direct memory access (RDMA) connection with the second endpoint; establishing a transmission control protocol (TCP) connection with the second endpoint; or establishing a QUIC connection with the second endpoint.

In an implementation of the foregoing computer-readable storage medium, the method further comprises: receiving, from the application, a series of commands comprising: a first series command comprising an indication that the first series command is first in the series of commands, a second series command comprising an indication that the second series command is intermediate in the series of commands, and a third series command comprising an indication that the third series command is last in the series of commands; and transmitting the first, second, and third series commands as a batch of commands to the second endpoint.

In an implementation of the foregoing computer-readable storage medium, the first command indicates the connection is to be established for: reading data stored by the storage system or writing data to the storage system.

In an implementation of the foregoing computer-readable storage medium, the second endpoint comprises: an endpoint of the storage node; an endpoint of a managing service associated with the storage node; or an endpoint of a second broker that manages the storage node.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Further still, several example embodiments have been described with respect to cloud storage service applications. However, it is also contemplated herein that embodiments of network storage acceleration may be used in other network storage applications (e.g., enterprise network storage service applications).

Moreover, according to the described embodiments and techniques, any components of systems, computing devices, storage systems, host nodes, storage nodes, storage interface controllers, front ends, and/or brokers and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A host system comprising:
a circuit board; and
a storage interface controller mounted to the circuit board, the storage interface controller configured to:
receive, from an application being executed by a processor of the host system separate from the storage interface controller, a first command configured to establish a connection with a storage service of a storage system, the storage system physically separate from and communicatively coupled to the host system, the first command comprising a session token corresponding to a session between the application and the storage service, the session token generated by the storage service;
provide the session token to a first broker of the storage system at a first endpoint, the first broker configured to manage a cluster of storage nodes, wherein providing the session token to the first broker causes the first broker to:
authenticate the session token, and
responsive to authentication of the session token, select a storage node from the cluster of storage nodes with which to establish a connection with the storage interface controller;
receive, from the first broker, a first response comprising a second endpoint associated with the storage node;
establish a connection with the second endpoint; and
map the second endpoint to a storage object.

2. The host system of claim 1, wherein the storage interface controller is further configured to:
prior to the receipt of the first command:
receive, from the application, a second command configured to establish a connection with the storage service,
responsive to the receipt of the second command, obtain the first endpoint, and
map the first endpoint to the session token; and
provide the session token to the first broker based on the first endpoint having been mapped to the session token.

3. The host system of claim 2, wherein to obtain the first endpoint, the storage interface controller is further configured to:
provide the session token to a second broker of the storage service, the second broker configured to manage traffic to and from a set of brokers of the storage service, the set of brokers comprising the first broker; and
receive, from the second broker, a second response comprising the first endpoint.

4. The host system of claim 3, wherein the second broker is a regional broker and the set of brokers are brokers within a region managed by the second broker.

5. The host system of claim 3, wherein to provide the session token to a second broker, the storage interface controller is further configured to randomly select the second broker from among brokers of the storage service.

6. The host system of claim 1, the storage interface controller is a non-volatile memory express (NVMe) controller.

7. The host system of claim 1, wherein the storage interface controller is further configured to:
receive, from the application, a series of commands comprising:
a first series command comprising an indication that the first series command is first in the series of commands,
a second series command comprising an indication that the second series command is intermediate in the series of commands, and
a third series command comprising an indication that the third series command is last in the series of commands;
generate a fused command with the first series command as a first portion in order of the fused command, the second series command as an intermediate portion in order of the fused command, and the third series command as a last portion in order of the fused command; and
transmit the fused command to the second endpoint.

8. The host system of claim 1, wherein the first command indicates the connection is to be established for:
reading data stored by the storage system, or
writing data to the storage system.

9. The host system of claim 1, wherein the second endpoint comprises:
an endpoint of the storage node;
an endpoint of a managing service associated with the storage node; or
an endpoint of a second broker of the storage system that manages the storage node.

10. A method implemented by a storage interface controller of a computing device, the method comprising:
receiving, from an application being executed by a processor of the computing device separate from the storage interface controller, a session token corresponding to a session between the application and a storage service of a storage system, the storage system physically separate from and communicatively coupled to the computing device, the session token generated by the storage service;
providing the session token to a first broker of the storage service, the first broker configured to manage traffic to and from a set of brokers of the storage service, the set of brokers comprising a second broker;
receiving, from the first broker, a first endpoint corresponding to the second broker;
receiving, from the application, a first command configured to establish a connection with a storage node of the storage service, the first command comprising the session token;
providing the session token to the second broker at the first endpoint, the second broker configured to manage a cluster of storage nodes, the cluster of storage nodes comprising the storage node;
receiving, from the second broker, a first response comprising a second endpoint associated with the storage node;
establishing a connection with the second endpoint; and
mapping the second endpoint to a storage object.

11. The method of claim 10, further comprising:
prior to receiving the first command:
receiving, from the application, a second command configured to establish a connection with the storage service,
responsive to receiving the second command, obtaining the first endpoint, and
mapping the first endpoint to the session token; and
wherein said providing the session token to the second broker is based on the first endpoint having been mapped to the session token.

12. The method of claim 10, wherein the second broker is a regional broker and the set of brokers are brokers within a region managed by the second broker.

13. The method of claim 10, wherein said providing the session token to the first broker comprises randomly selecting the first broker from among brokers of the storage service.

14. The method of claim 10, wherein said establishing a connection with the second endpoint comprises:
establishing a remote direct memory access (RDMA) connection with the second endpoint;
establishing a transmission control protocol (TCP) connection with the second endpoint; or
establishing a QUIC connection with the second endpoint.

15. The method of claim 10, further comprising:
receiving, from the application, a series of commands comprising:
a first series command comprising an indication that the first series command is first in the series of commands,
a second series command comprising an indication that the second series command is intermediate in the series of commands, and
a third series command comprising an indication that the third series command is last in the series of commands; and
transmitting the first, second, and third series commands as a batch of commands to the second endpoint.

16. The method of claim 10, wherein the first command indicates the connection is to be established for:
reading data stored by the storage system, or
writing data to the storage system.

17. The method of claim 10, wherein the second endpoint comprises:
an endpoint of the storage node;
an endpoint of a managing service associated with the storage node; or
an endpoint of a third broker of the storage system that manages the storage node.

18. A computer-readable storage medium encoded with program instructions that, when executed by a first processor circuit of a host system, performs a method comprising:
receiving, from an application being executed by a second processor circuit of the host system, a first command configured to establish a connection with a storage service of a storage system, the storage system physically separate from and communicatively coupled to the host system, the first command comprising a session token corresponding to a session between the application and the storage service, the session token generated by the storage service;
providing the session token to a first broker of the storage system at a first endpoint, the first broker configured to manage a cluster of storage nodes, wherein providing the session token to the first broker causes the first broker to:
authenticate the session token, and
responsive to authentication of the session token, select a storage node from the cluster of storage nodes with which to establish a connection with the storage interface controller;
receiving, from the first broker, a first response comprising a second endpoint associated with the storage node;
establishing a connection with the second endpoint; and
mapping the second endpoint to a storage object.

19. The computer-readable storage medium of claim 18, wherein the method further comprises:
prior to receiving the first command:
receiving, from the application, a second command configured to establish a connection with the storage service,
responsive to receiving the second command, obtaining the first endpoint, and
mapping the first endpoint to the session token; and
wherein said providing the session token to a first broker is based on the first endpoint having been mapped to the session token.

20. The computer-readable storage medium of claim 19, wherein said obtaining the first endpoint comprises:
providing the session token to a second broker of the storage service, the second broker configured to manage traffic to and from a set of brokers of the storage service, the set of brokers comprising the first broker; and
receiving, from the second broker, a second response comprising the first endpoint.

* * * * *